(12) United States Patent
Mancini et al.

(10) Patent No.: US 12,552,472 B2
(45) Date of Patent: Feb. 17, 2026

(54) VEHICLE TRACK SYSTEM AND ASSEMBLY FOR OFF-ROAD CONDITIONS

(71) Applicant: HELLTRAXX, LLC, Sterling Heights, MI (US)

(72) Inventors: Steven Mancini, Clinton Township, MI (US); MD Mirazul Islam, Warren, MI (US); Jerome Penxa, Shelby Township, MI (US)

(73) Assignee: HELLTRAXX, LLC, Sterling Heights, MI (US)

( * ) Notice: Subject to any disclaimer, the term of this patent is extended or adjusted under 35 U.S.C. 154(b) by 0 days.

(21) Appl. No.: 19/047,729

(22) Filed: Feb. 7, 2025

(65) Prior Publication Data

US 2025/0178679 A1 Jun. 5, 2025

Related U.S. Application Data

(63) Continuation-in-part of application No. 17/323,174, filed on May 18, 2021, now Pat. No. 12,280,839.
(Continued)

(51) Int. Cl.
*B62D 55/135* (2006.01)
*B62D 55/12* (2006.01)
(Continued)

(52) U.S. Cl.
CPC ........... *B62D 55/135* (2013.01); *B62D 55/12* (2013.01); *B62D 55/32* (2013.01); *B62D 55/065* (2013.01);
(Continued)

(58) Field of Classification Search
CPC .... B62D 55/12; B62D 55/125; B62D 55/135; B62D 55/13; B62D 55/32
See application file for complete search history.

(56) References Cited

U.S. PATENT DOCUMENTS 3,412,821 A 11/1968 Humphrey
3,688,858 A * 9/1972 Jespersen ............. B62D 55/125
180/9.1

(Continued)

FOREIGN PATENT DOCUMENTS

CA 2980208 A1 3/2019
RU 174334 U1 10/2017

OTHER PUBLICATIONS

Wahl Bros, No Slip Drive Sprockets, Sep. 11, 2011, https://web.archive.org/web/20110911175717/http://wahlracing.com/No_Slip_Drive_Sprocket_Installation_Instructions.pdf (Year: 2011).*
(Continued)

*Primary Examiner* — Kip T Kotter
(74) *Attorney, Agent, or Firm* — REISING ETHINGTON, P.C.

(57) ABSTRACT

A vehicle track system and assembly for outfitting vehicles for mobility in off-road conditions. Snow, mud, muck, soil, sand, ice, and other fickle conditions are more readily traversed. In an implementation, a spindle, a first driver, a drive sleeve, a second driver, and a single track are all part of the vehicle track assembly. Multiple of these components of the vehicle track assembly are furnished with one or more clocking indicia. The clocking indicia serves to provide rotational alignment indications amid assemblage procedures of the components of the vehicle track assembly. Proper timing of the drivers with respect to each other and attendant engagement with the single track is hence facilitated. Binding or other shortcomings observed with improperly-timed drivers is more readily resolved.

17 Claims, 27 Drawing Sheets

Related U.S. Application Data

(60) Provisional application No. 63/026,349, filed on May 18, 2020.

(51) Int. Cl.
  *B62D 55/32* (2006.01)
  *B62D 55/065* (2006.01)
  *B62D 55/088* (2006.01)
  *B62D 55/092* (2006.01)
  *B62D 55/24* (2006.01)
  *B62D 55/26* (2006.01)

(52) U.S. Cl.
  CPC .......... *B62D 55/088* (2013.01); *B62D 55/092* (2013.01); *B62D 55/24* (2013.01); *B62D 55/26* (2013.01)

(56) References Cited

U.S. PATENT DOCUMENTS

| | | | |
|---|---|---|---|
| 3,737,001 A | 6/1973 | Rasenberger | |
| 5,636,911 A * | 6/1997 | Korpi | F16H 7/06 |
| | | | 305/193 |
| 6,006,847 A * | 12/1999 | Knight | B62D 55/04 |
| | | | 180/9.26 |
| 7,597,167 B2 * | 10/2009 | Kubota | B62M 27/02 |
| | | | 305/179 |
| 8,708,432 B2 * | 4/2014 | Pard | B62D 55/12 |
| | | | 305/195 |
| 9,828,065 B2 * | 11/2017 | Pard | B62D 55/244 |
| 10,266,215 B2 | 4/2019 | Jean et al. | |
| 10,392,060 B2 | 8/2019 | Dandurand et al. | |
| 2003/0141125 A1 * | 7/2003 | Wahl | B62D 55/07 |
| | | | 180/182 |
| 2004/0017109 A1 * | 1/2004 | Deland | B62D 55/13 |
| | | | 305/199 |
| 2004/0045747 A1 * | 3/2004 | Albright | B62D 55/125 |
| | | | 180/9.1 |
| 2004/0061378 A1 * | 4/2004 | Girard | B62D 55/125 |
| | | | 305/199 |
| 2006/0060395 A1 | 3/2006 | Boivin et al. | |
| 2009/0085398 A1 * | 4/2009 | Maltais | B62D 55/26 |
| | | | 305/178 |
| 2015/0136497 A1 | 5/2015 | Morin | |
| 2015/0183464 A1 * | 7/2015 | Mannering | B62D 55/084 |
| | | | 180/9.46 |
| 2015/0291234 A1 | 10/2015 | Zuchoski et al. | |
| 2016/0016639 A1 | 1/2016 | Pard | |
| 2017/0233018 A1 * | 8/2017 | Buchanan | B62D 55/02 |
| | | | 305/125 |
| 2018/0265146 A1 | 9/2018 | Laplante et al. | |
| 2019/0092405 A1 | 3/2019 | Dandurand | |
| 2019/0248432 A1 | 8/2019 | Gagne et al. | |
| 2022/0250695 A1 * | 8/2022 | Söderström | B62D 55/135 |

OTHER PUBLICATIONS

International Search Report and Written Opinion for International Application No. PCT/US21/32918 dated Aug. 16, 2021 (22 pages).
International Preliminary Report on Patentability for International Application No. PCT/US2021/032918 dated Nov. 17, 2022 (7 pages).
EP Extended Search Report for EP Serial No. 2180839.8 dated Sep. 26, 2024 (8 pages).

* cited by examiner

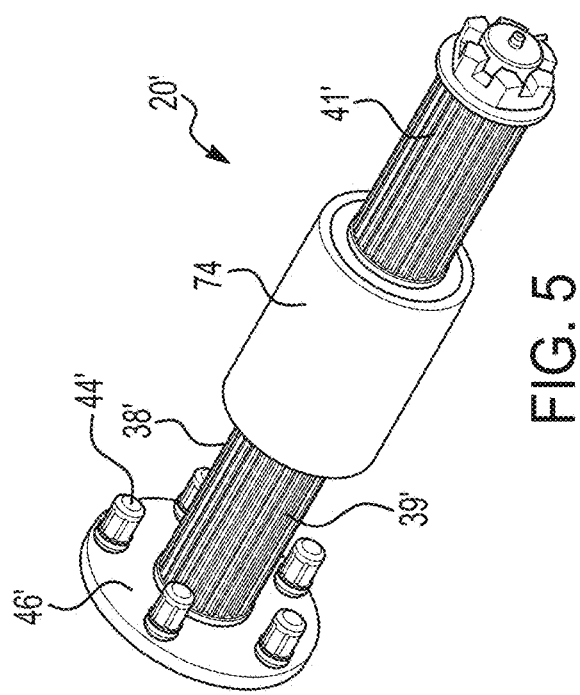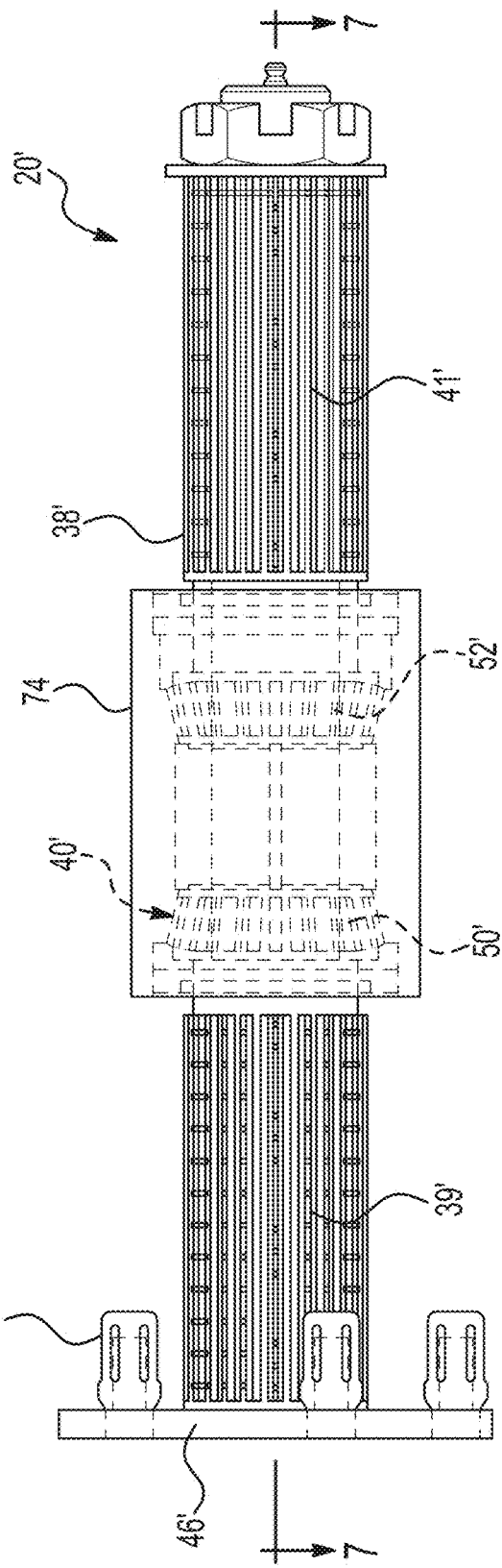

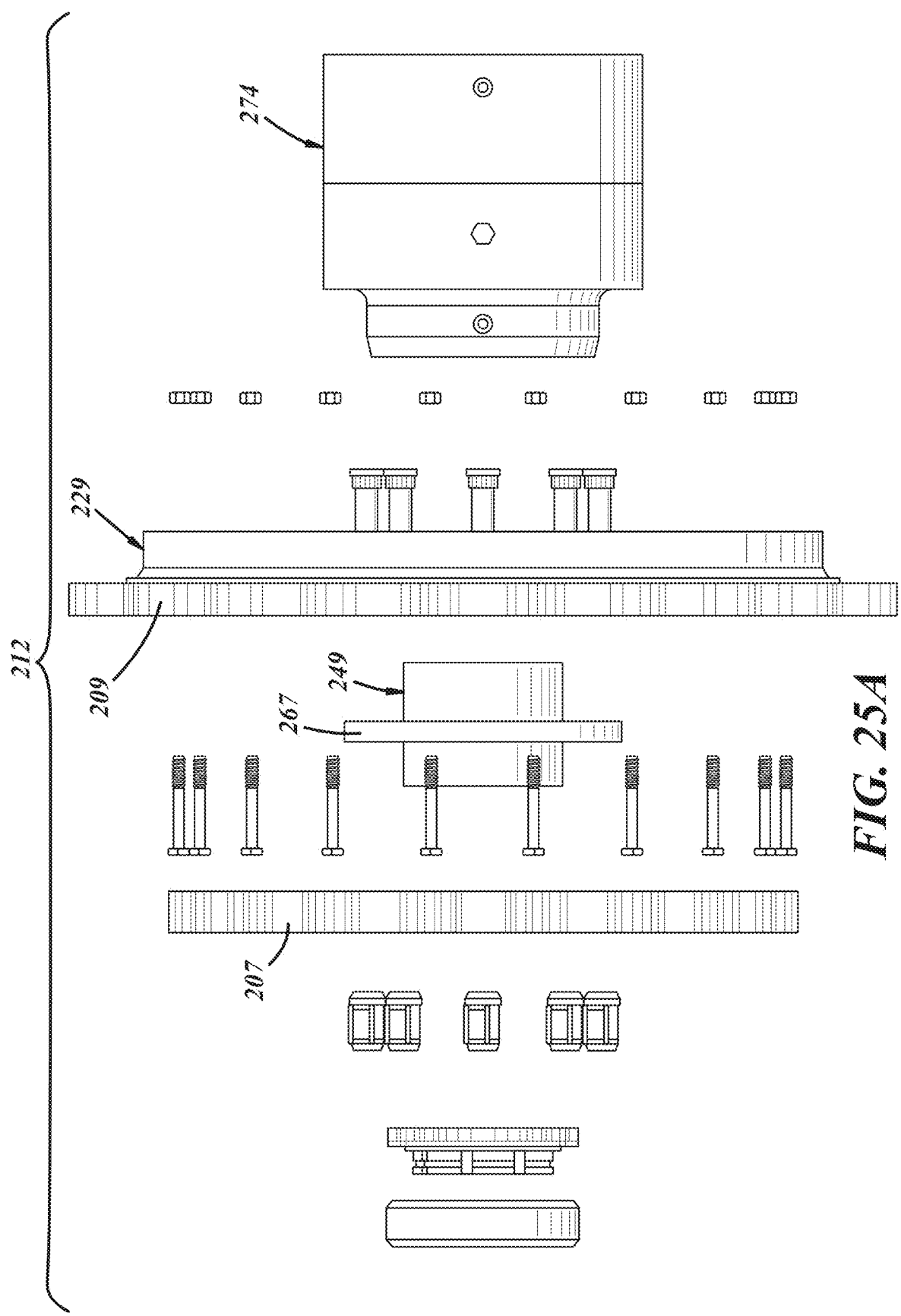

VEHICLE TRACK SYSTEM AND ASSEMBLY FOR OFF-ROAD CONDITIONS

CROSS-REFERENCE TO RELATED APPLICATION

This patent application is a continuation-in-part of U.S. patent application Ser. No. 17/323,174, filed May 18, 2021, which claims the benefit of U.S. Provisional Patent Application No. 63/026,349, filed on May 18, 2020.

TECHNICAL FIELD

This disclosure relates generally to track systems and assemblies that outfit vehicles for mobility in off-road conditions.

BACKGROUND

Vehicle track systems and assemblies are typically employed to enable vehicles to more easily traverse conditions and grounds that are unsteady and less certain. Snow, mud, muck, soil, sand, and ice are examples of such conditions. The systems and assemblies are intended to provide improved traction and, in some instances, floatation of the vehicle. Automobiles like sport utility vehicles (SUVs), all-terrain vehicles (ATVs), utility vehicles, and recreation vehicles, among others, can be equipped with vehicle track systems and assemblies. In the case of automobiles, the vehicle track systems and assemblies are commonly retrofitted on the automobiles and installed in place of its wheels. In the case of other vehicles, in contrast, the vehicle track systems and assemblies can be a part of the original equipment of the vehicles.

SUMMARY

In an embodiment, a vehicle track assembly may include a spindle, a first driver, a drive sleeve, a second driver, and a single track. The spindle has a first set of splines and has a first clocking indicia. The first driver is connected to the spindle and is driven to rotate by the spindle. The drive sleeve has a second set of splines. The drive sleeve is driven to rotate by the spindle by way of the assembled engagement between the first set of splines and the second set of splines. The drive sleeve has a second clocking indicia. The second driver is connected to the drive sleeve and is driven to rotate by the drive sleeve. The single track is driven to move by the first driver and by the second driver. The first clocking indicia and second clocking indicia possess a rotationally-aligned arrangement with respect to one another. The rotationally-aligned arrangement among the first and second clocking indicia serves to provide concurrent and corresponding driving engagement between said first driver and single track and said second driver and single track with respect to each other.

In an embodiment, a method of providing concurrent and corresponding engagement among driver teeth of multiple drivers and sets of slots of a single track in a vehicle track assembly has several steps. One step may involve providing a spindle that has a first set of splines and that has a first clocking indicia; providing a first driver that has a first set of teeth and that has a second clocking indicia; providing a drive sleeve that has a second set of splines and that has a third clocking indicia; providing a second driver that has a second set of teeth and that has a fourth clocking indicia; and providing a single track that has a first set of slots residing therein and that has a second set of slots residing therein. Another step may involve establishing rotational alignment of the first clocking indicia and the second clocking indicia with respect to each other upon connection between the spindle and the first driver. Another step may involve establishing rotational alignment of the first clocking indicia and the third clocking indicia with respect to each other upon engagement between the first set of splines and the second set of splines of the spindle and the drive sleeve. Yet another step may involve establishing rotational alignment of the third clocking indicia and the fourth clocking indicia with respect to each other upon connection between the drive sleeve and the second driver.

In an embodiment, a vehicle track assembly may include a spindle, a first driver, a drive sleeve, a second driver, a spacer, and a single track. The spindle has a first set of splines and has a first clocking indicia. The first driver is driven to rotate by the spindle. The first driver includes a first driver hub and a first driver trackring. The first driver hub is connected to the spindle. The first driver hub has a second clocking indicia. The first driver trackring has a first set of teeth and has a third clocking indicia. The drive sleeve has a second set of splines. The drive sleeve is driven to rotate by the spindle by way of assembly between the first set of splines and the second set of splines. The drive sleeve has a fourth clocking indicia. The second driver is driven to rotate by the drive sleeve. The second drive is driven to rotate by the drive sleeve. The second driver includes a second driver hub and a second driver trackring. The second driver hub is connected to the driver sleeve. The second driver hub has a fifth clocking indicia. The second driver trackring has a second set of teeth and has a sixth clocking indicia. The spacer is connected to the first driver. The spacer has a connection with a vehicle component upon installation of the vehicle track assembly on a vehicle. The spacer has a seventh clocking indicia. The single track is driven to move by the first driver and by the second driver. The single track has a first set of slots spanning therearound, and has a second set of slots spanning therearound. The first set of slots receives recurring insertion of the first set of teeth of the first driver trackring during use of the vehicle track assembly. And the second set of slots similarly receives recurring insertion of the second set of teeth of the second driver trackring during use of the vehicle track assembly.

BRIEF DESCRIPTION OF DRAWINGS

The following detailed description of an embodiment is set forth with reference to the accompanying drawings, in which:

FIG. 5 is a perspective view of an embodiment of a hub assembly of the vehicle track assembly;

FIG. 6 is side view of the hub assembly, showing a section in phantom;

FIG. 25A is an exploded side view of certain components of the vehicle track assembly of FIG. 22;

DETAILED DESCRIPTION OF EMBODIMENTS

The figures present embodiments of a vehicle track system 10 and a vehicle track assembly 12 for outfitting vehicles for mobility in off-road conditions where grounds can be unsteady and less certain. The vehicle track system 10 and assembly 12 can be retrofitted on a vehicle or can be installed as part of the original equipment of a vehicle. Snow, mud, muck, soil, sand, and ice are example off-road conditions over which the system 10 and assembly 12 can improve traction and floatation of the accompanying vehicle. These conditions can exist in mountainous terrain, farmland, peatland, construction sites, and other environments. The term "vehicle" is intended to have an expansive meaning and includes automobiles like sport utility vehicles (SUVs) and trucks, as well as all-terrain vehicles (ATVs), utility vehicles, commercial vehicles, military vehicles, and recreation vehicles, among other types of vehicles. The vehicle track system 10 and assembly 12 outperforms previously-known track systems and assemblies. It has a lightweight, high strength construction. To more readily travel over more extreme conditions than past systems and assemblies—such as deep powder snow depths of ten feet and more—the vehicle track assembly 12 has a dual-track arrangement, per certain embodiments. The dual-track arrangement, as well as its other designs and constructions, are presented below in more detail with reference to the figures.

As used herein, and unless otherwise specified, the terms radially, axially, and circumferentially, and their grammatical variations refer to directions with respect to the generally circular and cylindrical shape of many of the components of the vehicle track assembly 12. Further, and unless otherwise specified, the term axial inboard refers to a direction AI, an example of which is provided in FIG. 20; and the term axial outboard refers to a direction AO, an example of which is provided in FIG. 20.

Figure 1:
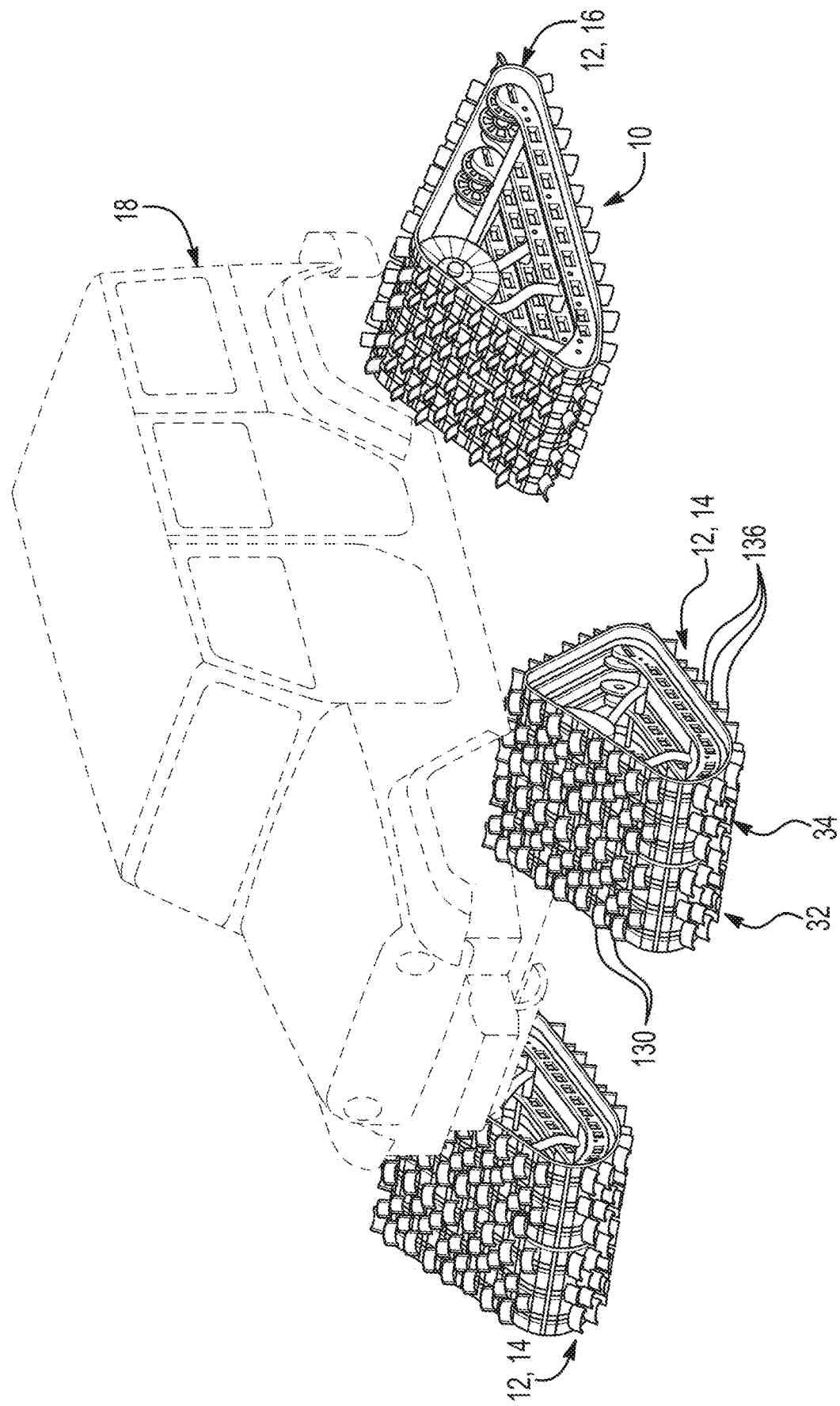
FIG. 1 depicts an embodiment of a vehicle track system for off-road conditions, the system shown retrofitted on an automobile.

Depending on the application, the vehicle track system 10 can include multiple vehicle track assemblies 12 installed and situated at a forward end, a rearward end, and/or a middle region of the particular vehicle. In the embodiment of FIG. 1, for example, the vehicle track system 10 includes a total of four individual vehicle track assemblies 12: a pair of front end vehicle track assemblies 14 and a pair of rear end vehicle track assemblies 16 (only one rear end vehicle track assembly is visible in the perspective view of FIG. 1). The front end and rear end vehicle track assemblies 14, 16 have similar designs and constructions in the embodiment presented, but in other embodiments could have different designs and constructions. Because of their similar designs and constructions, many of the descriptions of the front end vehicle track assembly 14 of FIGS. 2-11 apply to the rear end vehicle track assembly 16, and hence the descriptions referencing FIGS. 2-11 are generalized to a vehicle track assembly 12 whether intended for installation at a forward end, a rearward end, and/or a mid-region. In FIG. 1, the vehicle track assemblies 12, both front end and rear end, are retrofitted on an automobile 18 and replace its four wheels. The automobile 18 presented is a sport utility vehicle, as an example.

The vehicle track assembly 12 can have different designs, constructions, and components in various embodiments, depending on the particular application and accompanying vehicle and, in some cases, depending on the particular axle that the vehicle track assembly 12 is mounted to. In the embodiment of FIGS. 2-11, the vehicle track assembly 12 includes a hub assembly 20, a first driver 22, a second driver 24, a frame 26, a first rail 28, a second rail 30, a first track 32, and a second track 34.

The hub assembly 20 mounts the vehicle track assembly 12 to a vehicle component and is driven to rotate by the vehicle component and, in turn, incites rotation of the first and second drivers 22, 24. The vehicle component could be a rotor or a caliper or another component in the case of the automobile 18, or could be another type of component of another vehicle. The precise mounting can largely be dictated by the particular vehicle application. The hub assembly 20 can have different designs, constructions, and components in various embodiments. A first embodiment is presented in the sectional views of FIGS. 3 and 4. Here, a rotor 36 of the automobile 18 is depicted and the hub assembly 20 generally includes, as its main components, a spindle 38, a bearing assembly 40, and a hub 42.

The spindle 38 is mounted directly to the rotor 36 via a set of lug nuts 44 at a flanged end 46 of the spindle 38. The vehicle track assembly 12 is bolted on the rotor 36 via the set of lug nuts 44. Opposite the flanged end 46 across the spindle's elongated extent, the spindle 38 has a set of external splines for engagement with a set of internal splines of the hub 42. The spindle 38 is driven to rotate via its mounting with the rotor 36, and the spindle 38 in turn drives rotation of the hub 42 via engagement between the set of external splines and the set of internal splines. A lubricant passage 48 spans along a central axis of the spindle 38 for the introduction of lubricant to the bearing assembly 40. The bearing assembly 40 facilitates relative revolving movement between the hub assembly 20 and the frame 26. It particularly permits the spindle 38 to rapidly rotate amid use of the vehicle track assembly 12 with respect to, and independent of, a base hub component (subsequently introduced) of the frame 26 which encircles the spindle 38 and serves as an enclosure of the bearing assembly 40. The bearing assembly 40 includes a first set of bearings 50 and a second set of bearings 52, although it could include more or less sets of bearings in other embodiments. The first and second set of bearings 50, 52 are secured to the spindle 38, and are situated and sandwiched radially between the spindle 38 and the base hub component. The second set of bearings 52 is located axially outboard of the first set of bearings 50. The first and second set of bearings 50, 52 include multiple individual rollers abutting and rolling against an interior of the base hub component. The rollers can be held by cages. The hub 42 mounts to the spindle 38 via the splined engagement and accepts mounting of the second driver 24. In particular, the hub 42 has a cylindrical body that mounts to the spindle 38 and has a radially-outwardly extending flange that receives mounting of the second driver 24. The mounting between the flange and second driver 24 can involve bolting. Still, the hub assembly 20 can include more, less, and/or different main components and subcomponents in its construction than those described here. For example, the hub assembly 20 can include seals at the bearing assembly 40, spacers between components, and a washer and nut to secure mounting between the hub 42 and spindle 38.

The location of the bearing assembly 40 with respect to the first and second drivers 22, 24 and with respect to the first and second tracks 32, 34 serves to facilitate the use of dual drivers and dual tracks in the vehicle track assembly 12 according to some embodiments. In this embodiment, and as perhaps demonstrated best by FIGS. 3 and 4, the bearing assembly 40 and its first and second bearings 50, 52 are located and positioned at an approximate axial mid-region M (example depicted in FIG. 4) as established by the first and second drivers 22, 24 and/or as established by the first and second tracks 32, 34. The axial mid-region M can refer to an axial or longitudinal locality relative to the first and second drivers 22, 24 and/or relative to the first and second tracks 32, 34 (axial is used here relative to the circular and cylindrical shapes of the first and second drivers 22, 24). The precise location and axial extent of the axial mid-region M can vary in different embodiments (again, axial is used here relative to the circular and cylindrical shapes of the first and second drivers 22, 24). Stated another way, the bearing assembly 40 and the first and second bearings 50, 52 are axially sandwiched and interposed between the first and second drivers 22, 24 and the first and second tracks 32, 34. Since the frame 26 extends from the hub assembly 20 adjacent the bearing assembly 40 and at the axial mid-region M, this location and position may establish a center of load-bearing with suitable proximity to the rotor 36 to effectively endure loads exerted by the accompanying vehicle and exerted amid use of the vehicle track assembly 12, while accommodating an overall diameter of the spindle 38 that is suitable and practical for application purposes. Dual drivers and dual tracks may hence be more readily employed in the vehicle track assembly 12. Still, the location and position of the bearing assembly 40 with respect to the first and second drivers 22, 24 and with respect to the first and second tracks 32, 34 could be elsewhere in other embodiments.

Figure 7:
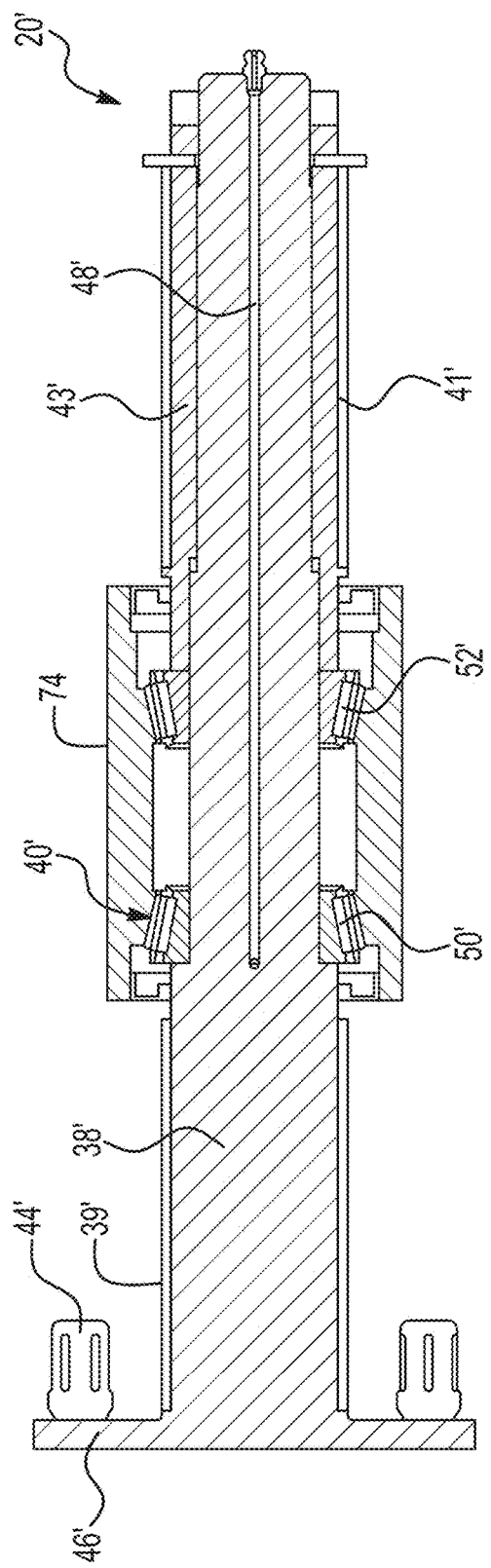
FIG. 7 is a sectional view of the hub assembly taken at arrowed line 7-7 in FIG. 6.

A second embodiment of the hub assembly 20' is presented in FIGS. 5-7. This embodiment is also intended for mounting to the rotor 36 of the automobile 18. The spindle 38' is mounted directly to the rotor 36 via the set of lug nuts 44' at the flanged end 46'. The vehicle track assembly 12 is bolted on the rotor 36 via the set of lug nuts 44'. The spindle 38' has a first set of external splines 39' residing over a first extent thereof and has a second set of external splines 41' residing over a second extent thereof. The first and second set of external splines 39', 41' are located on opposite ends of the elongated extent of the spindle's body and straddle both sides of the bearing assembly 40'. The first and second set of external splines 39', 41' respectively engage with corresponding sets of internal splines of the first and second drivers 22, 24. The second set of external splines 41' resides on a sleeve 43' that is inserted over the spindle's body and secured thereon. The sleeve 43' facilitates installation of the bearing assembly 40' and its components over the spindle 38'. The lubricant passage 48' spans along the spindle's central axis for introducing lubricant to the bearing assembly 40'. As before, the bearing assembly 40' permits the spindle 38' to rapidly rotate amid use of the vehicle track assembly 12 with respect to, and independent of, the frame's base hub component. The bearing assembly 40' includes the first set of bearings 50' and includes the second set of bearings 52'. Caged rollers of the first and second sets of bearings 50', 52' can roll against the base hub component's interior.

Figure 14:
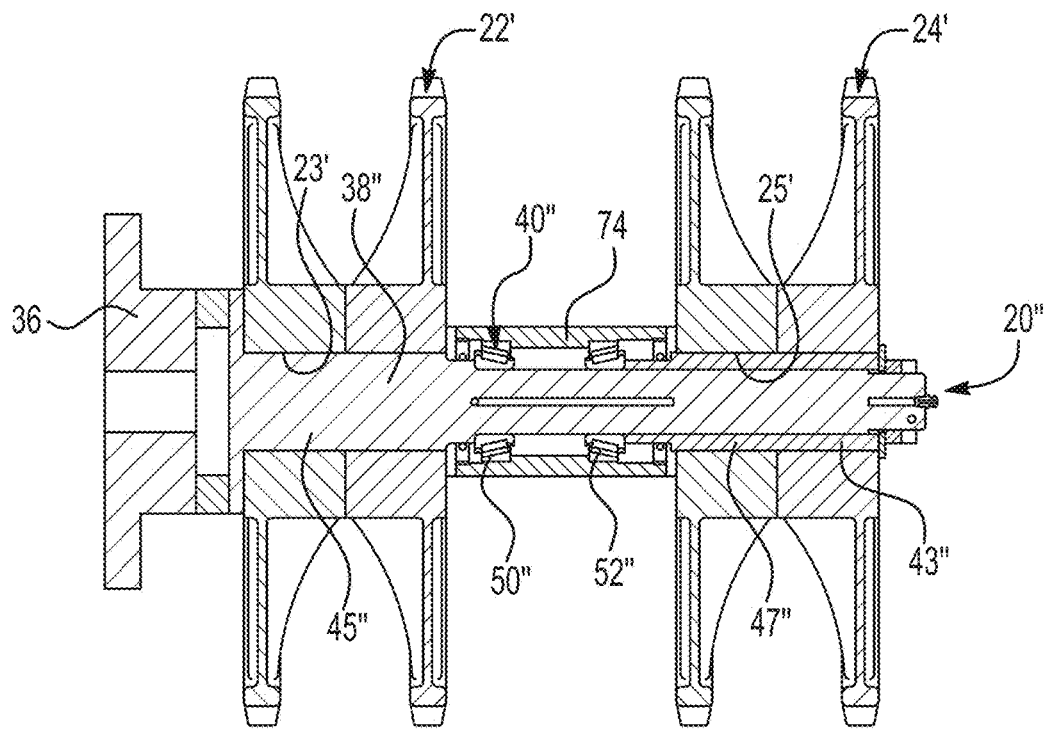
FIG. 14 is a sectional view of an embodiment of a hub assembly of the vehicle track assembly.
Figures 15A, 15B:
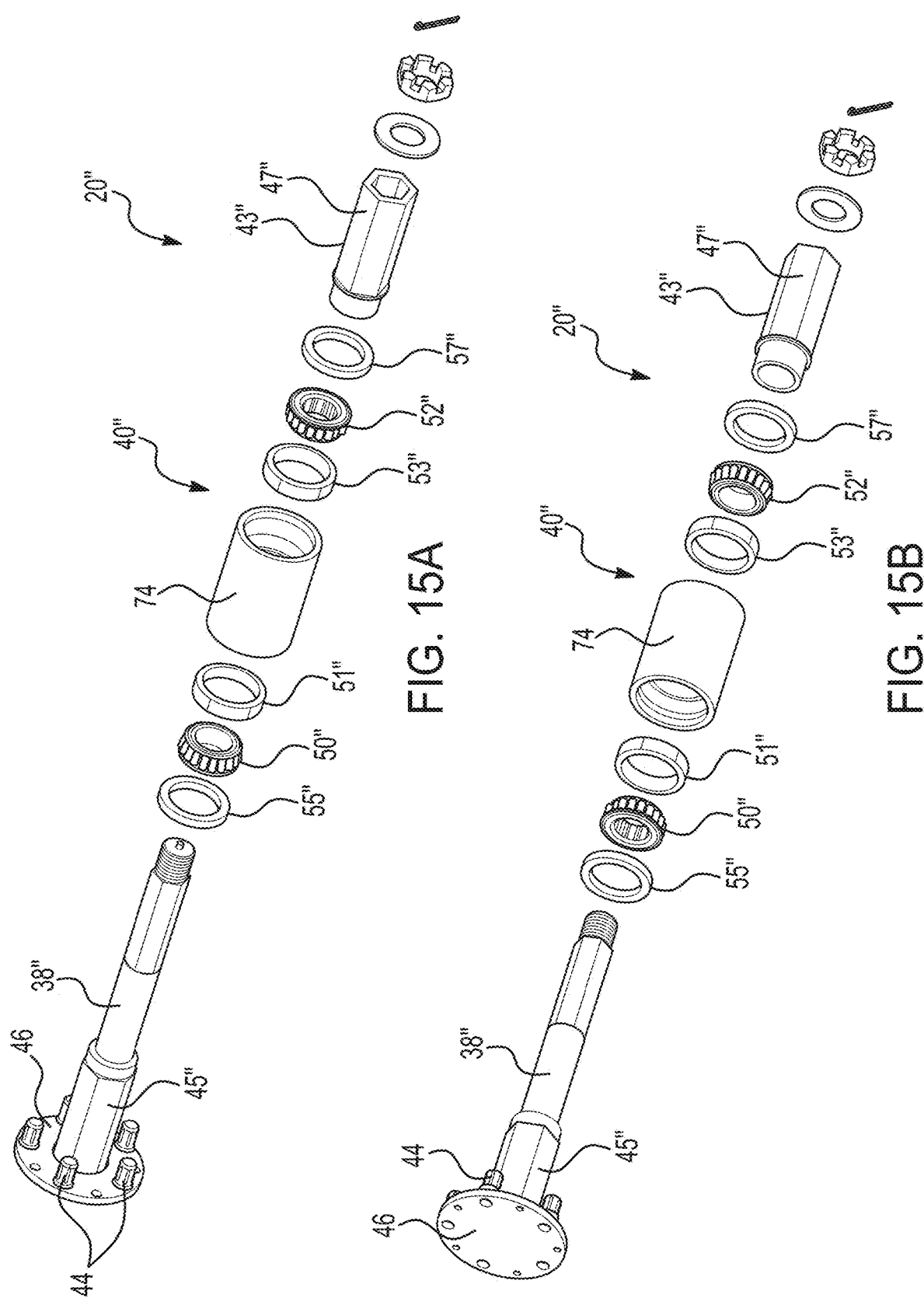
FIG. 15A is an exploded view of the hub assembly presented in FIG. 14.
FIG. 15B is another exploded view of the hub assembly presented in FIG. 14.
Figure 16:
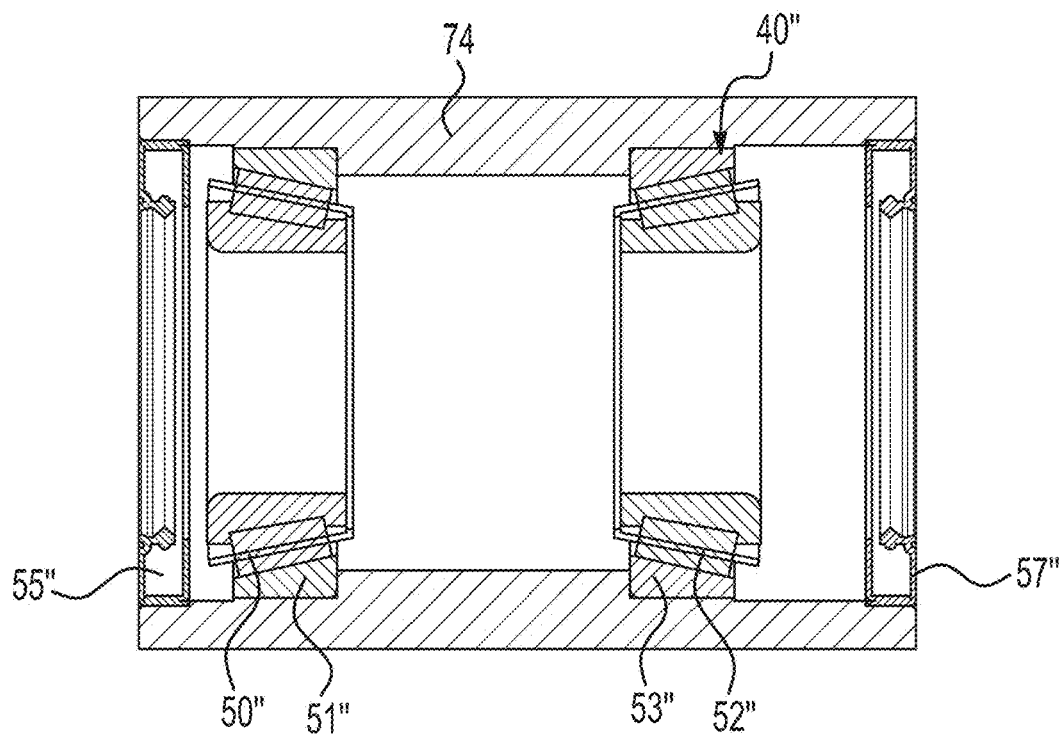
FIG. 16 is an enlarged sectional view of an embodiment of a bearing assembly of the hub assembly presented in FIG. 14.
Figure 17:
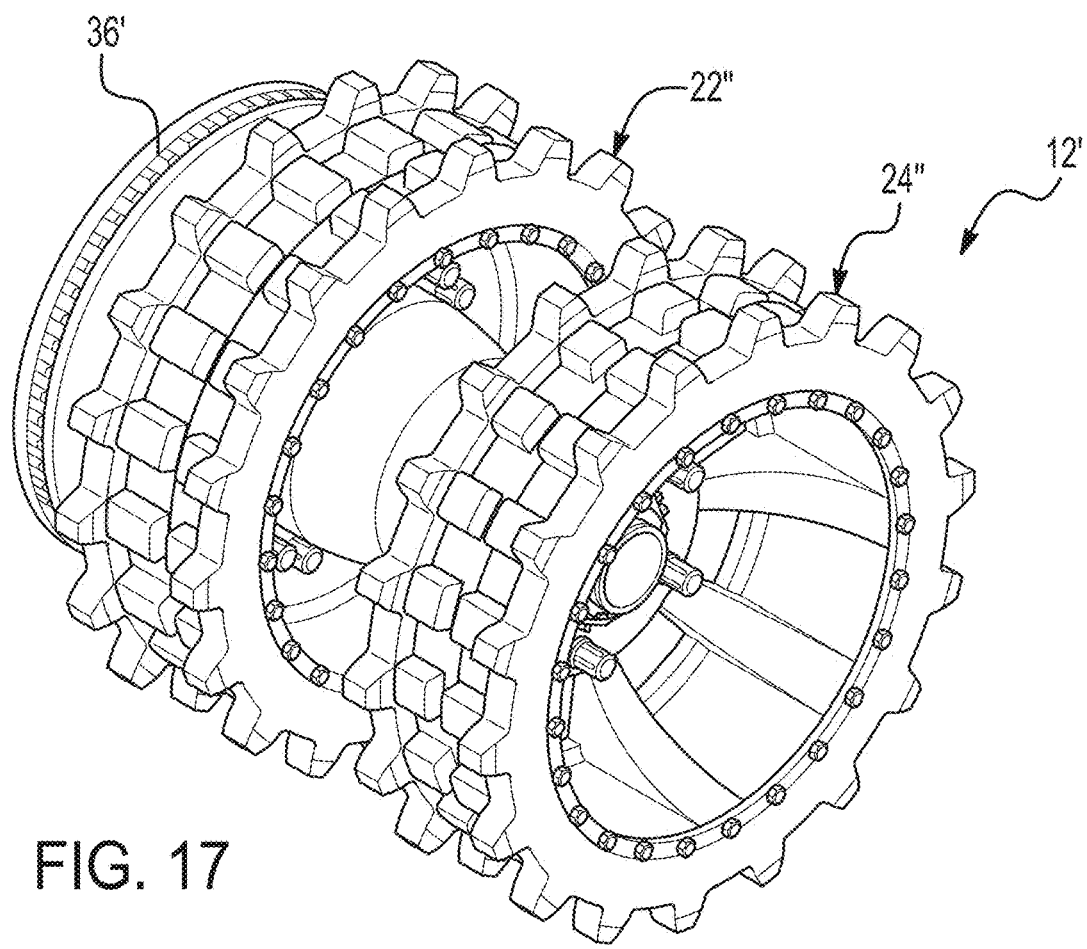
FIG. 17 is a perspective view of certain components of another embodiment of a vehicle track assembly for off-road conditions.
Figure 18:
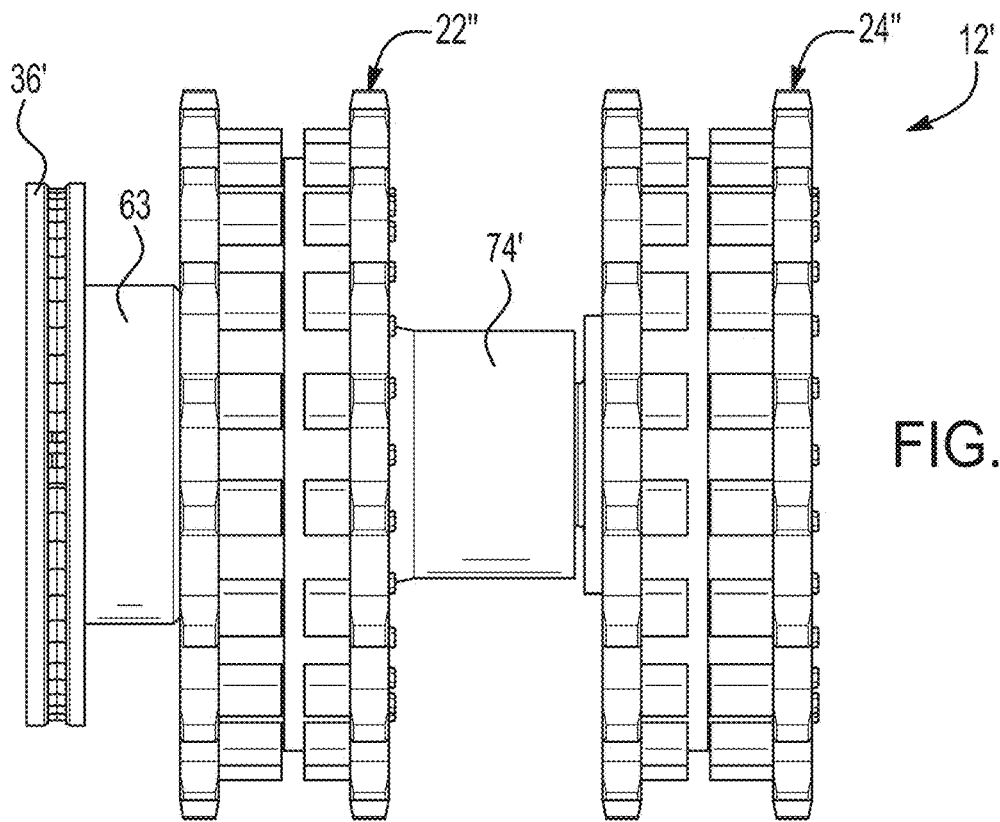
FIG. 18 is a front view of the vehicle track assembly of FIG. 17.

A third embodiment of the hub assembly 20" is presented in FIGS. 14-16. This embodiment is also intended for mounting to the rotor 36 of the automobile 18. The spindle 38" is mounted directly to the rotor 36 via the set of lug nuts 44" at the flanged end 46". The vehicle track assembly 12 is bolted on the rotor 36 via the set of lug nuts 44". The spindle 38" has a first or proximal extent 45" of hexagonal cross-sectional profile for receipt and engagement with a complementary bore of the first driver 22'. Similarly, the spindle 38" has a second or distal extent 47" of hexagonal cross-sectional profile for receipt and engagement with a complementary bore of the second driver 24'. The second extent 47" resides on a sleeve 43" that is inserted over the spindle's body and secured thereon. The sleeve 43" facilitates installation of the bearing assembly 40" and its components over the spindle 38". In other embodiments, these cross-sectional profiles could exhibit other non-circular shapes that transmit rotation from the spindle to the first and second drivers. As before, the bearing assembly 40" permits the spindle 38" to rapidly rotate amid use of the vehicle track assembly 12 with respect to, and independent of, the frame's base hub component. The bearing assembly 40" includes the first set of bearings 50" and includes the second set of bearings 52". The bearing assembly 40" further includes a first spacer or bushing 51" and a second spacer or bushing 53", and includes a first seal 55" and a second seal 57". The first and second seals 55", 57" serve to seal the open ends of the frame's base hub component against lubricant leakage from the spindle 38".

Figure 8:
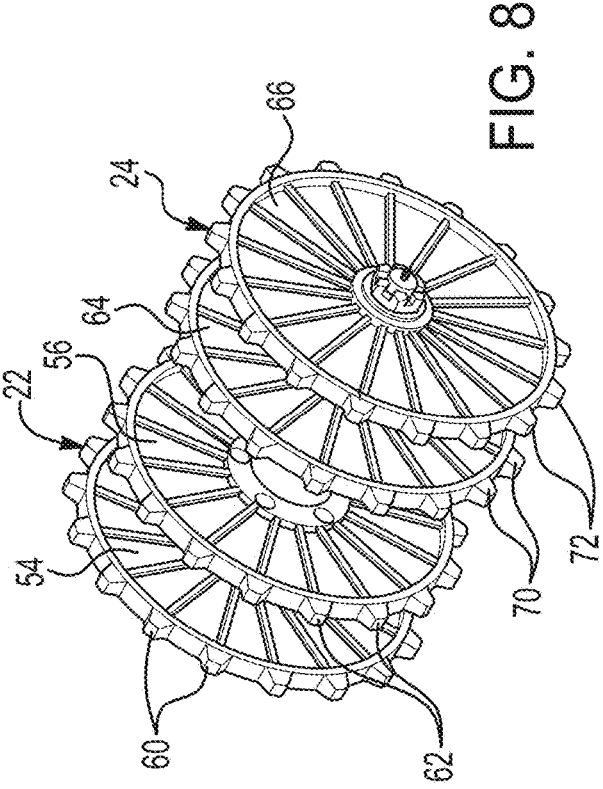
FIG. 8 is a perspective view of an embodiment of a first driver and a second driver of the vehicle track assembly.
Figure 9:
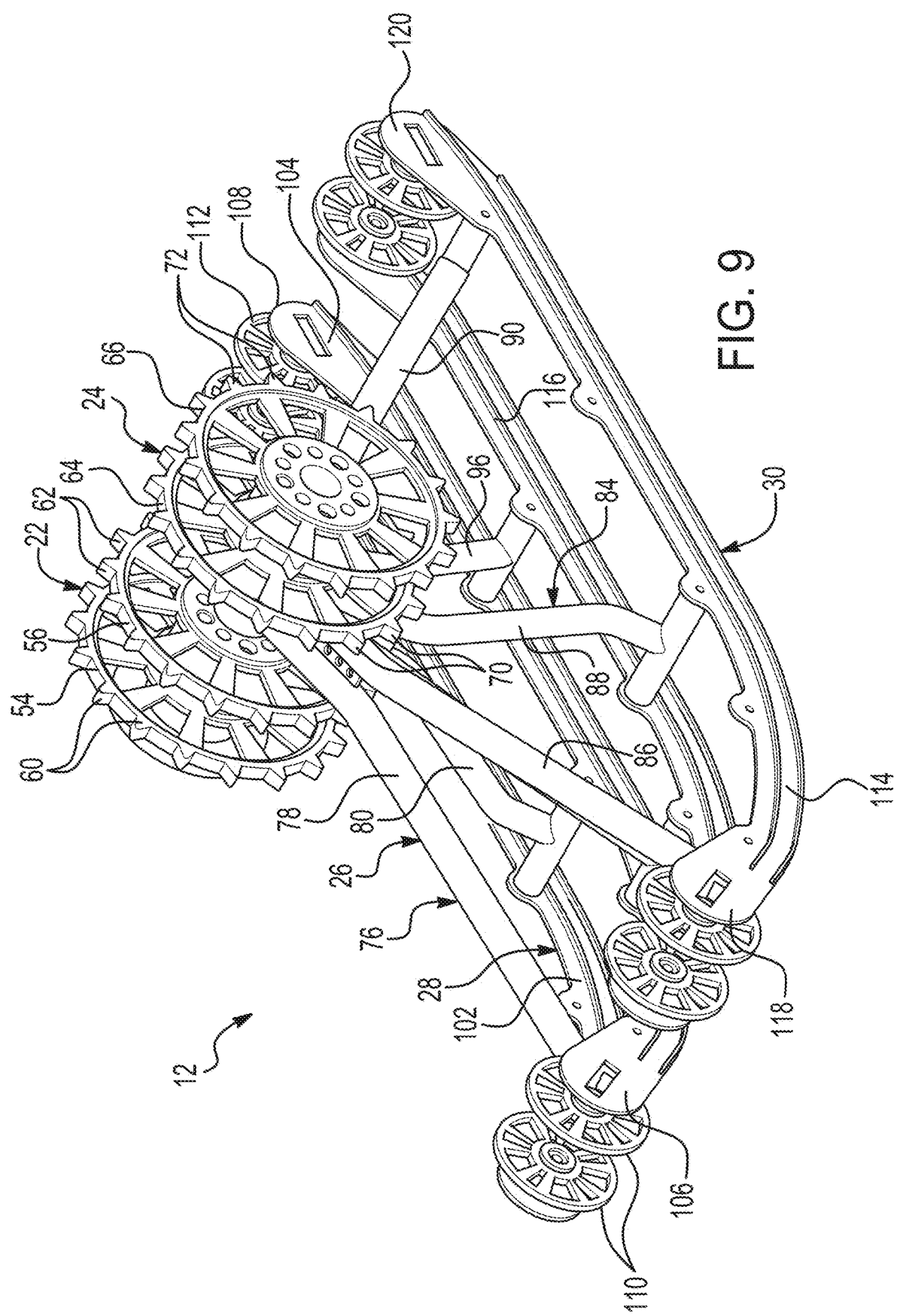
FIG. 9 is a perspective view of the vehicle track assembly, this view having tracks removed for demonstrative purposes.
Figure 10:
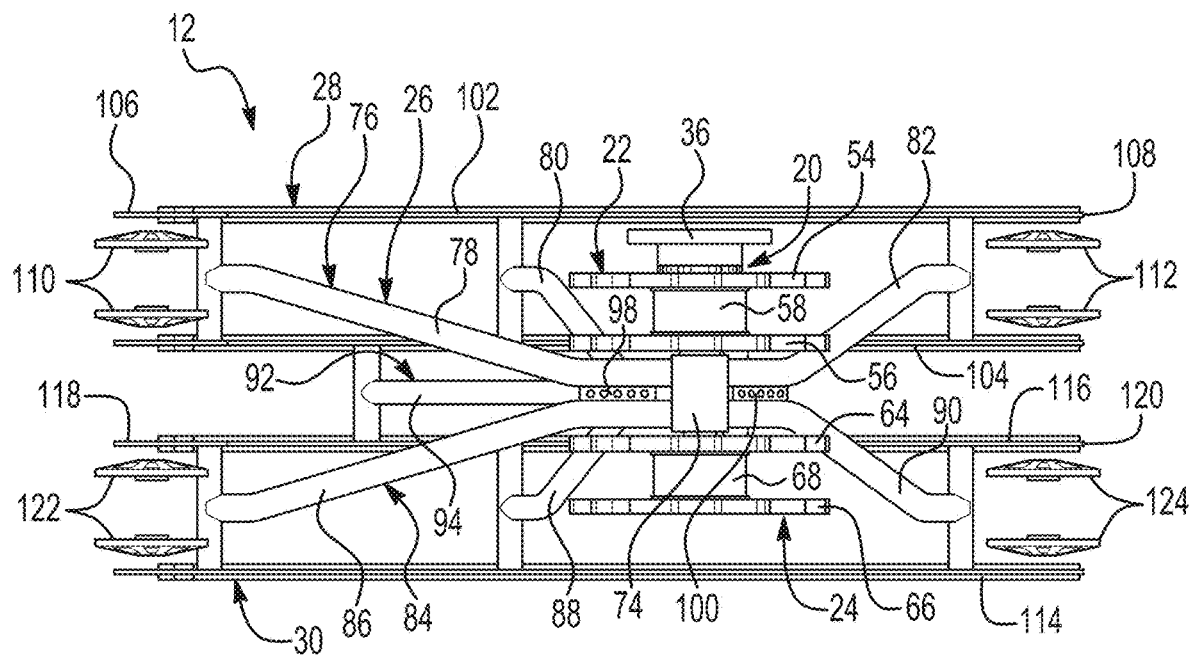
FIG. 10 is a top view of the vehicle track assembly presented in FIG. 9.

The first driver 22 is carried by and mounted to the hub assembly 20, and is driven to rotate by the hub assembly 20. The first driver 22 drives movement of the first track 32. In the case of the first embodiment of the hub assembly 20, the first driver 22 is bolted to the rotor 36; and in the case of the second embodiment of the hub assembly 20', the first driver 22 is mounted to the spindle 38' via spline-to-spline engagement. Still, in the case of the third embodiment of the hub assembly 20", a second embodiment of the first driver 22' has an internal bore 23' with a sectional profile complementing that of the spindle 38"; namely, the internal bore 23' has a hexagonal sectional profile. Referring now to FIGS. 8-10, in this embodiment the first driver 22 has an axially inboard location relative to the rotor 36 and relative to the second driver 24. The first driver 22 has a first trackring 54, a second trackring 56, and a driver hub 58 extending therebetween. The first trackring 54 has a set of first teeth 60 for meshing engagement with first slots of the first track 32. Likewise, the second trackring 56 has a set of second teeth 62 for meshing engagement with second slots of the first track 32. The first and second trackrings 54, 56 extend radially-outwardly from the driver hub 58. As set forth above, for the second embodiment of the hub assembly 20', the driver hub 58 has a set of internal splines for engagement with the first set of external splines 39'. In the example of FIG. 8, the first driver 22 is composed of a plastic material. Plastic for the first driver 22 has been shown to generate minimized heat amid use of the vehicle track assembly 12. In another example, that of FIGS. 9 and 10, the first driver 22 is composed of an aluminum material. Whatever its composition, the first driver 22 can have a monolithic or a multi-piece overall structure.

The second driver 24 is carried by and mounted to the hub assembly 20, and is driven to rotate by the hub assembly 20. Unlike the first driver 22, the second driver 24 drives movement of the second track 34. In the case of the first embodiment of the hub assembly 20, the second driver 24 is bolted to the hub 42; and in the case of the second embodiment of the hub assembly 20', the second driver 24 is mounted to the spindle 38' via spline-to-spline engagement. Still, in the case of the third embodiment of the hub assembly 20", a second embodiment of the first driver 24' has an internal bore 25' with a sectional profile complementing that of the spindle 38"; namely, the internal bore 25' has a hexagonal sectional profile. Referring now to FIGS. 8-10, in this embodiment the second driver 24 has an axially outboard location relative to the rotor 36 and relative to the first driver 22. The second driver 24 has a similar design and construction to the first driver 22. As such, the second driver 24 has a first trackring 64, a second trackring 66, and a driver hub 68 extending therebetween. The first trackring 64 has a set of first teeth 70 for meshing engagement with first slots of the second track 34. Likewise, the second trackring 66 has a set of second teeth 72 for meshing engagement with second slots of the second track 34. The first and second trackrings 64, 66 extend radially-outwardly from the driver hub 68. As set forth above, for the second embodiment of the hub assembly 20', the driver hub 68 has a set of internal splines for engagement with the second set of external splines 41'. In the example of FIG. 8, the second driver 24 is composed of a plastic material. Plastic for the second driver 24 has been shown to generate minimized heat amid use of the vehicle track assembly 12. In another example, that of FIGS. 9 and 10, the second driver 24 is composed of an aluminum material. Whatever its composition, the second driver 24 can have a monolithic or a multi-piece overall structure.

Figure 11:
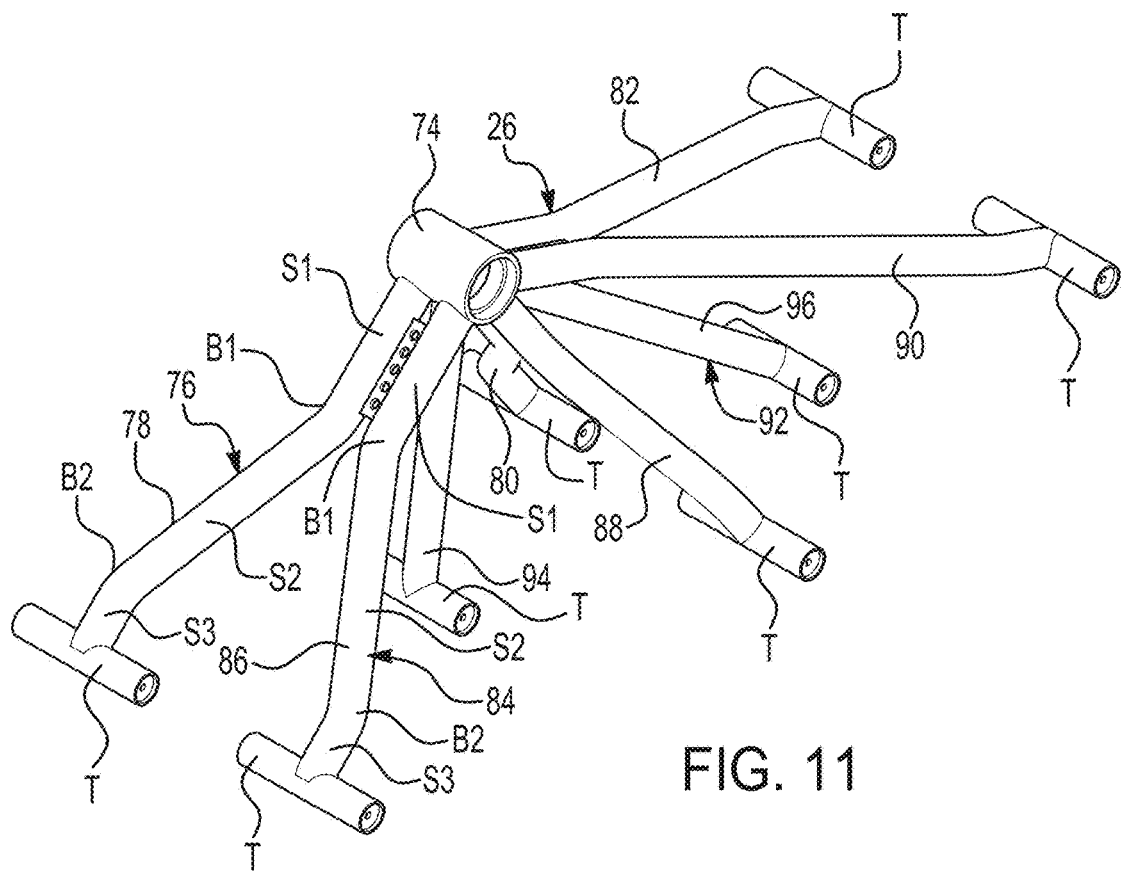
FIG. 11 is a perspective view of an embodiment of a frame with multiple frame members of the vehicle track assembly.

The frame 26 spans from the hub assembly 20 and to the first and second rails 28, 30. It provides somewhat of a skeletal support structure of the vehicle track assembly 12 that endures loads experienced by the vehicle track assembly 12 amid use. With reference to FIGS. 9-11, in this embodiment the frame 26 includes a number of discrete frame members that extend from a base hub 74 and that have discrete connections to the first rail 28, to the second rail 30, or to both of the first and second rails 28, 30. The discrete frame members can be welded to the base hub 74. The precise number of discrete frame members can vary in different embodiments and is dictated by the particular application and the expected loads encountered by the vehicle track assembly 12. In the embodiment here, a first set of frame members 76 extends from the base hub 74 and to the first rail 28. As demonstrated perhaps best by FIGS. 4 and 10, a location from which the first set of frame members 76 initially extends from the base hub 74 is at the axial mid-region M. The first set of frame members 76 exhibits an inboard location relative to the rotor 36 and has three discrete frame members: a first or forward frame member 78, a second or mid frame member 80, and a third or rearward frame member 82. As perhaps demonstrated best by the view of FIG. 11, each frame member has an overall extent (taken from the base hub 74 to the first rail 28) with a pair of bends B1, B2 that establish three linear segments S1, S2, S3. The first frame member 78 has a first connection to the first rail 28, particularly to both first side rail components of the first rail 28. Similarly, the second frame member 80 has a second connection to the first rail 28 and particularly to both first side rail components. And the third frame member 82 has a third connection to the first rail 28 and particularly to both first side rail components. The first, second, and third connections are separate connections at different locations on the first rail 28, and can each be via a tie tube T. The tie tube T can have flanges (not shown) on each of its ends for the first, second, and third connections, though need not. The tie tubes T can be welded to their respective frame member. The connections can be a bolted connection.

Furthermore, in the embodiment of FIGS. 9-11, a second set of frame members 84 extends from the base hub 74 and to the second rail 30. As demonstrated perhaps best by FIGS. 4 and 10, a location from which the second set of frame members 84 initially extends from the base hub 74 is at the axial mid-region M. The second set of frame members 84 exhibits an outboard location relative to the rotor 36 and, like the first set of frame members 76, has three discrete frame members: a first or forward frame member 86, a second or mid frame member 88, and a third or rearward frame member 90. As perhaps demonstrated best by the view of FIG. 11, each frame member has an overall extent (taken from the base hub 74 to the second rail 30) with a pair of bends B1, B2 that establish three linear segments S1, S2, S3. Indeed, the shape of the frame members 86, 88, 90 of the second set of frame members 84 mirror those of the first set of frame members 76. Together, the first frame members 78, 86 establish a first A-frame structure, the second frame members 80, 88 establish a second A-frame structure, and the third frame members 82, 90 establish a third A-frame structure. The A-frame structures facilitate resistance of the loads encountered during use of the vehicle track assembly 12. The first frame member 86 has a first connection to the second rail 30, particularly to both second side rail components of the second rail 30. Similarly, the second frame member 88 has a second connection to the second rail 30 and particularly to both second side rail components. And the third frame member 90 has a third connection to the second rail 30 and particularly to both second side rail components. The first, second, and third connections are separate connections at different locations on the second rail 30, and can each be via the tie tube T. The tie tube T can have flanges (not shown) on each of its ends for the first, second, and third connections, though need not. The tie tubes T can be welded to their respective frame member. The connections can be a bolted connection.

Also, the frame 26 in this embodiment has a third set of frame members 92. The third set of frame members 92 extends from the base hub 74 and to both of the first and second rails 28, 30. As demonstrated perhaps best by FIGS. 4 and 10, a location from which the third set of frame members 92 initially extends from the base hub 74 is at the axial mid-region M. The third set of frame members 92 exhibits a middle location relative to the first and second sets of frame members 76, 84. As perhaps shown best by FIG. 11, the third set of frame members 92 has two discrete frame members: a first or forward frame member 94 and a second or rearward frame member 96. Unlike previous frame members, the first and second frame members 94, 96 have overall extents that are singularly linear and that lack any bends. The first frame member 94 has first connections to one of the first side rail components of the first rail 28 and to one of the second side rail components of the second rail 30. In a similar manner, the second frame member 96 has second connections to one of the first side rail components of the first rail 28 and to one of the second side rail components of the second rail 30. As before, the first and second connections are separate connections at different locations on the first and second rails 28, 30, and the connections can be bolted connections. The connections can each be via the tie tube T. Still, in other embodiments, the third set of frame members 92 need not be provided.

The base hub 74 accepts insertion of a section of the hub assembly 20 and serves as a housing for the bearing assembly 40 and the first and second sets of bearings 50, 52. As perhaps shown best by the sectional views of FIGS. 3 and 4, the base hub 74 has a cylindrical exterior shape with a hollow interior spanning between a pair of circular open ends. In a similar way as previously described, the location of the base hub 74 with respect to the first and second drivers 22, 24 and with respect to the first and second tracks 32, 34—and particularly the location of extension of the frame members from the base hub 74—serves to facilitate the use of dual drivers and dual tracks in the vehicle track assembly 12 according to some embodiments; the base hub 74 and location of extension of the frame members are located and positioned at the approximate axial mid-region M established by the first and second drivers 22, 24 and the first and second tracks 32, 34. Furthermore, by way of the bearing assembly 40, the frame 26 is able to revolve to a certain degree about the base hub 74 as called for amid use of the vehicle track assembly 12. For instance, the frame 26 could be prompted to revolve upward relative to the underlying ground upon initial approach of an environmental obstacle. Lastly, and with reference to FIG. 10, a first web 98 and a second web 100 can extend laterally between the first and second sets of frame members 76, 84 to further connect and strengthen them. The first web 98 extends between the first frame members 78, 86, and the second web 100 extends between the third frame members 82, 90.

The first rail 28 guides the first track 32 as the first track 32 moves across the underlying ground. The first rail 28 has an inboard location relative to the rotor 36. With reference to FIGS. 9 and 10, in this embodiment the first rail 28 includes a first side rail 102 and a second side rail 104. The first and second side rails 102, 104 have similar designs and constructions. They extend longitudinally between first and second longitudinal ends 106, 108. To facilitate guidance of the first track 32, an elongated slide can be attached to a bottom side of the first and second side rails 102, 104 for direct and immediate contact with the first track 32; the slide can be composed of a plastic material or some other material, and can serve to present a flatter surface over which the first track 32 comes into contact with the first and second side rails 102, 104. A pair of first wheels 110 is carried by and rotatably mounted to the first and second side rails 102, 104 at the first longitudinal end 106. Likewise, a pair of second wheels 112 is carried by and rotatably mounted to the first and second side rails 102, 104 at the second longitudinal end 108. The first track 32 rides and rolls over the pair of first and second wheels 110, 112. Each of the first, second, and third frame members 78, 80, 82 of the first set of frame members 76 are connected to the first and second side rails 102, 104 of the first rail 28.

The second rail 30 guides the second track 34 as the first track 34 moves across the underlying ground. The second rail 30 has an axially outboard location relative to the rotor 36 and relative to the first rail 28. With reference to FIGS. 9 and 10, in this embodiment the second rail 30 includes a first side rail 114 and a second side rail 116. The first and second side rails 114, 116 have similar designs and constructions. They extend longitudinally between first and second longitudinal ends 118, 120. To facilitate guidance of the second track 34, an elongated slide can be attached to a bottom side of the first and second side rails 114, 116 for direct and immediate contact with the second track 34; the slide can be composed of a plastic material or some other material, and can serve to present a flatter surface over which the second track 34 comes into contact with the first and second side rails 114, 116. A pair of first wheels 122 is carried by and rotatably mounted to the first and second side rails 114, 116 at the first longitudinal end 118. Likewise, a pair of second wheels 124 is carried by and rotatably mounted to the first and second side rails 114, 116 at the second longitudinal end 120. The second track 34 rides and rolls over the pair of first and second wheels 122, 124. Each of the first, second, and third frame members 86, 88, 90 of the second set of frame members 84 are connected to the first and second side rails 114, 116 of the second rail 30.

Figure 4:
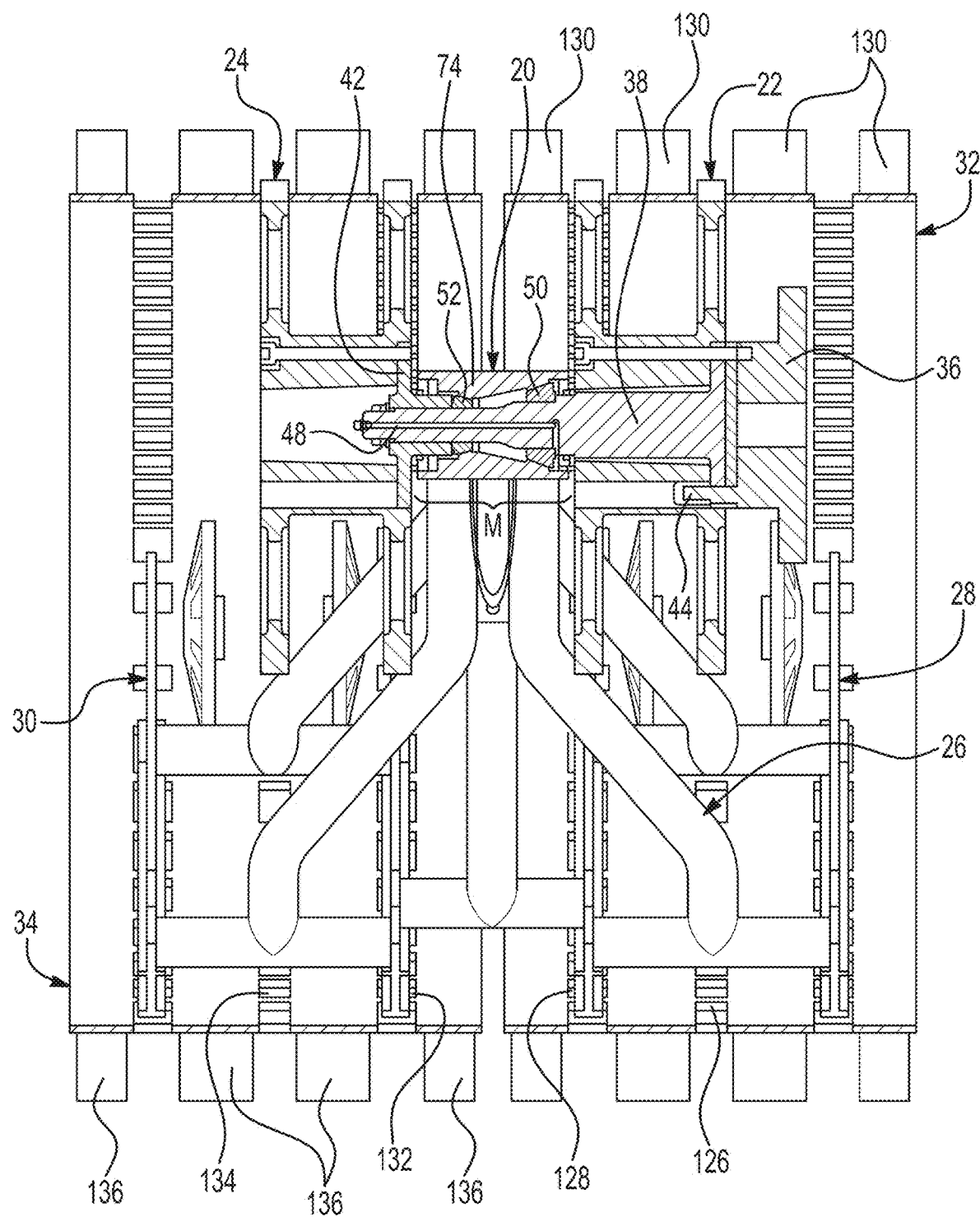
FIG. 4 is a sectional view of components of the vehicle track assembly taken at arrowed line 4-4 in FIG. 2.

The first track 32 is driven to move by the first driver 22 and comes into direct contact with the ground lying beneath the vehicle track assembly 12. Referring now to FIGS. 1 and 4, in this embodiment the first track 32 has an endless loop structure that spans around the exterior of the vehicle track assembly 12. It can be composed of a hard rubber material. A set of first slots 126 resides in the first track 32 and spans wholly therearound for meshing engagement with the set of first teeth 60 of the first trackring 54. Similarly, a set of second slots 128 resides laterally beside the set of first slots 126 and spans wholly therearound for meshing engagement with the set of second teeth 62 of the second trackring 56. Further, the first track 32 can have a pair of internal grooves for seating respectively with the first and second side rail 102, 104 of the first rail 28. At its exterior, the first track 32 has multiple first paddles 130 extending outwardly from a main body of the first track 32. The first paddles 130 can be arranged in rows and columns across the lateral and longitudinal extents of the first track 32.

Figure 2:
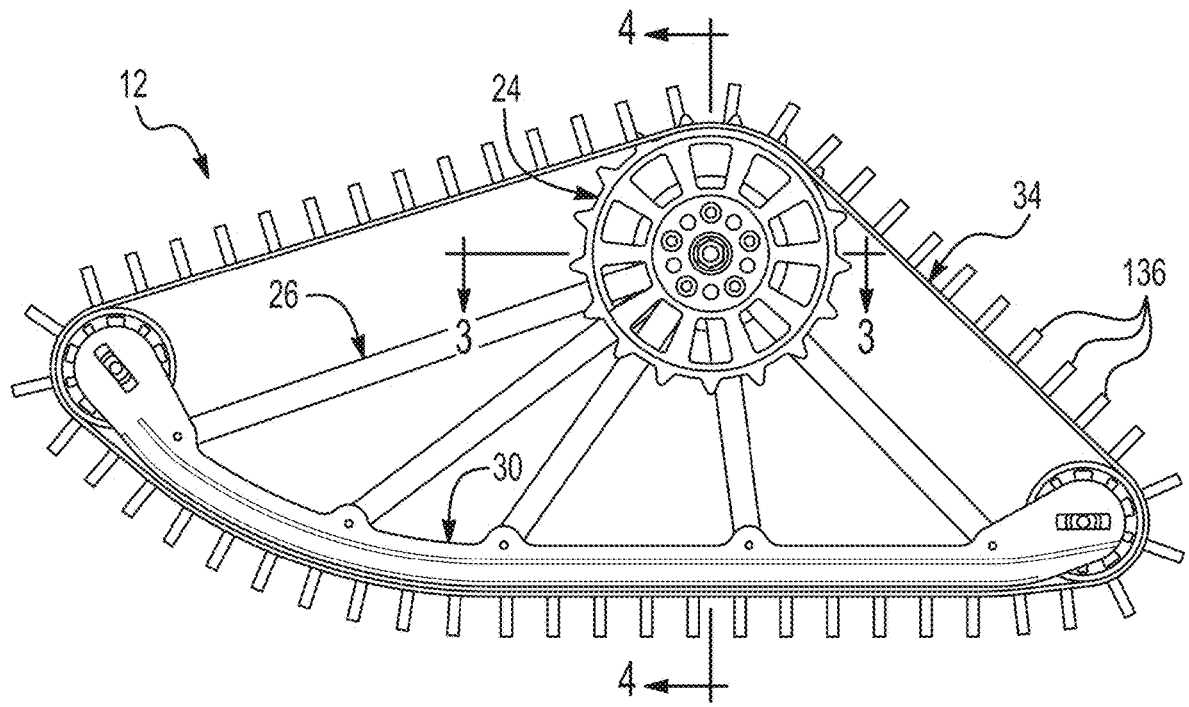
FIG. 2 is a side view of an embodiment of a vehicle track assembly for off-road conditions, this embodiment is intended for installation at a front end of the automobile.
Figure 3:
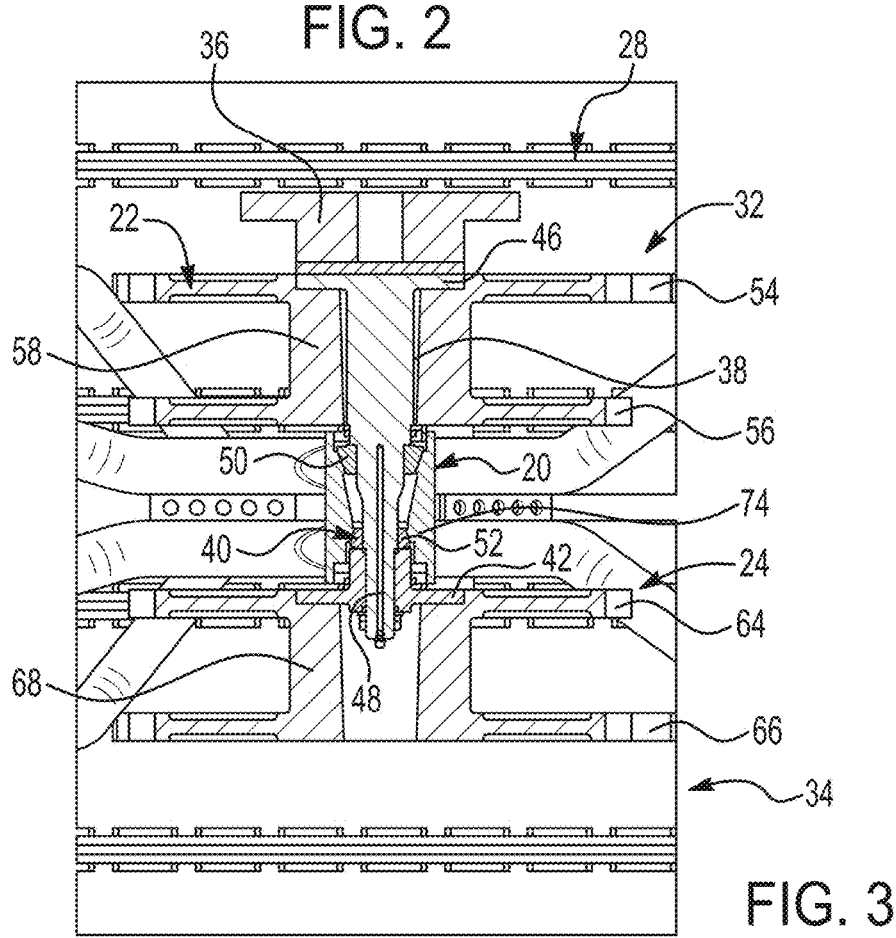
FIG. 3 is a sectional view of components of the vehicle track assembly taken at arrowed line 3-3 in FIG. 2.

The second track 34 is driven to move by the second driver 24 and comes into direct contact with the ground lying beneath the vehicle track assembly 12. Referring now to FIGS. 1, 2, and 4, in this embodiment the second track 34 has the same design and construction as the first track 32. The second track 34 has an endless loop structure that spans around the exterior of the vehicle track assembly 12. It can be composed of a hard rubber material. A set of first slots 132 resides in the second track 34 and spans wholly therearound for meshing engagement with the set of first teeth 70 of the first trackring 64. Similarly, a set of second slots 134 resides laterally beside the set of first slots 132 and spans wholly therearound for meshing engagement with the set of second teeth 72 of the second trackring 66. Further, the second track 34 can have a pair of internal grooves for seating respectively with the first and second side rail 114, 116 of the second rail 30. At its exterior, the second track 34 has multiple second paddles 136 extending outwardly from a main body of the second track 34. The second paddles 136 can be arranged in rows and columns across the lateral and longitudinal extents of the second track 34.

Together, the first and second track 32, 34 constitute the dual-track arrangement of the vehicle track assembly 12. In the embodiment presented by the figures, the dual-track arrangement improves traction and floatation of the accompanying vehicle and furnishes the ability to travel over more extreme conditions than past systems and assemblies. The first and second tracks 32, 34 maximize the area over which the vehicle track assembly 12 and the vehicle track system 10 exhibit direct and immediate confrontation with the underlying ground. This provides a greater area available to endure loads of the accompanying vehicle and those experienced amid use. Loads are hence more readily dispersed and less concentrated. Vehicles of greater weight such as SUVs can be retrofitted with the vehicle track system 10 and assemblies 12. Moreover, an increased number of paddles can make direct contact with the underlying ground. In an example embodiment, each track 32, 34 of a single front end vehicle track assembly 14 can have approximately thirty-two or more individual paddles in contact with the underlying ground, yielding a total of approximately sixty-four or more individual paddles in contact with the underlying ground for the single front end vehicle track assembly 14. Similarly, in an example embodiment, each track 32, 34 of a single rear end vehicle track assembly 16 can have approximately forty or more individual paddles in contact with the underlying ground, yielding a total of approximately eighty or more individual paddles in contact with the underlying ground for the single rear end vehicle track assembly 16. According to these example embodiments, a vehicle having a pair of front end vehicle track assemblies 14 and a pair of rear end vehicle track assemblies 16 would have a total of approximately two-hundred and eighty-eight or more individual paddles in contact with the underlying ground.

Figure 12:
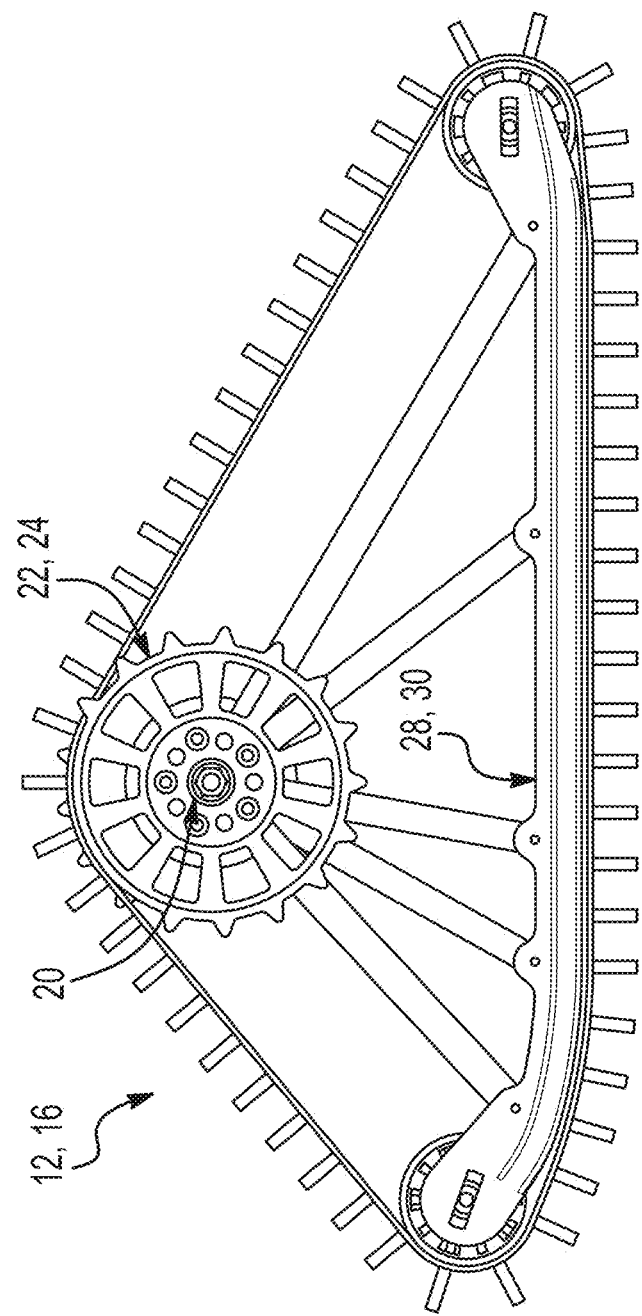
FIG. 12 is a side view of another embodiment of a vehicle track assembly for off-road conditions, this embodiment is intended for installation at a rear end of the automobile.
Figure 13:
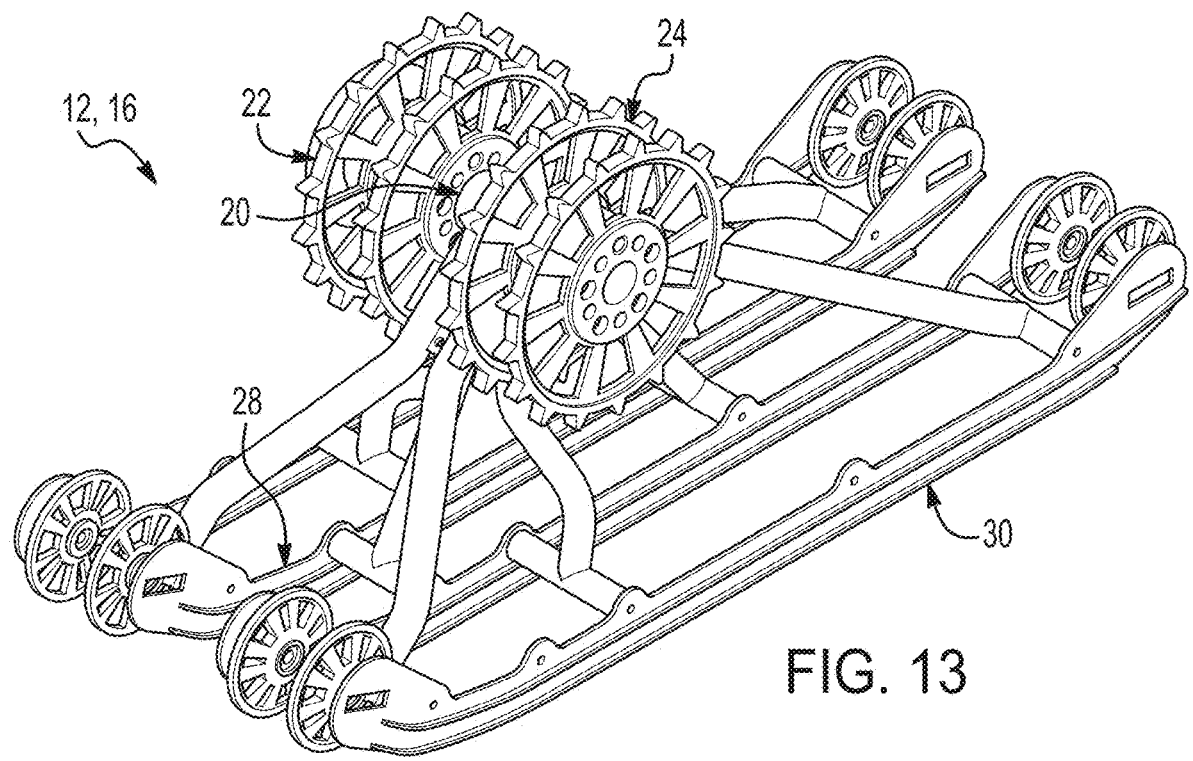
FIG. 13 is a perspective view of the vehicle track assembly, this view having tracks removed for demonstrative purposes.

As set forth above, in the embodiment presented by the figures the front end and rear end vehicle track assemblies 14, 16 have similar designs and constructions. Nevertheless, the rear end vehicle track assembly 16 is presented in FIGS. 12 and 13 to illustrate some differences. An examination of the figures reveal many of the same designs, constructions, and components as described above with reference to FIGS. 2-11. These same designs, constructions, and components are not repeated here, but may be equally applicable. One difference is a location of the hub assembly 20 and first and second drivers 22, 24 relative to the first and second rails 28, 30, and another difference is a forward region of the first and second rails 28, 30. The hub assembly 20 and first and second drivers 22, 24 are positioned closer to a forward region of the rear end vehicle track assembly 16 compared to the front end vehicle track assembly 14. And the forward region of the first and second rails 28, 30 of the rear end vehicle track assembly 16 is more level with the underlying ground compared to that of the front end vehicle track assembly 14 which has a more pronounced forward region for facilitating initial approach of environmental obstacles that are encountered.

Another embodiment of the vehicle track assembly 12' is presented in FIGS. 17-21. A fourth embodiment of the hub assembly 20''' is provided in this embodiment. The hub assembly 20''' mounts the vehicle track assembly 12' to the rotor 36' of the automobile 18, and mounts the vehicle track assembly 12' to a hub 61 of the automobile 18; still, in other example applications similar to the fourth embodiment, the hub 61 could be absent and/or there could be other vehicle components of the automobile 18 involved in the mounting of the vehicle track assembly 12'. The rotor 36' in this example has an extension with an axial portion 63 and a radial portion 65. Further, the hub 61 in this example has a radially-extending flange 67 at an exterior of a main body of the hub 61. The hub 61 spans a greater axial outboard distance than the rotor 36'. The hub assembly 20''' is designed and constructed to bring the transfer of loads exerted amid use more axially inboard and in closer proximity to the rotor 36' and in closer proximity to the hub 61. Cantilever loads experienced at the rotor 36', hub 61, and/or other vehicle component are hence minimized. It has been found that loads may be more effectively endured in this way. At least some loads exerted amid use of the vehicle track assembly 12' are transmitted from the frame 26, through the base hub 74', and to the spindle 38''' via the first and second sets of bearings 50''', 52'''.

Figure 19:
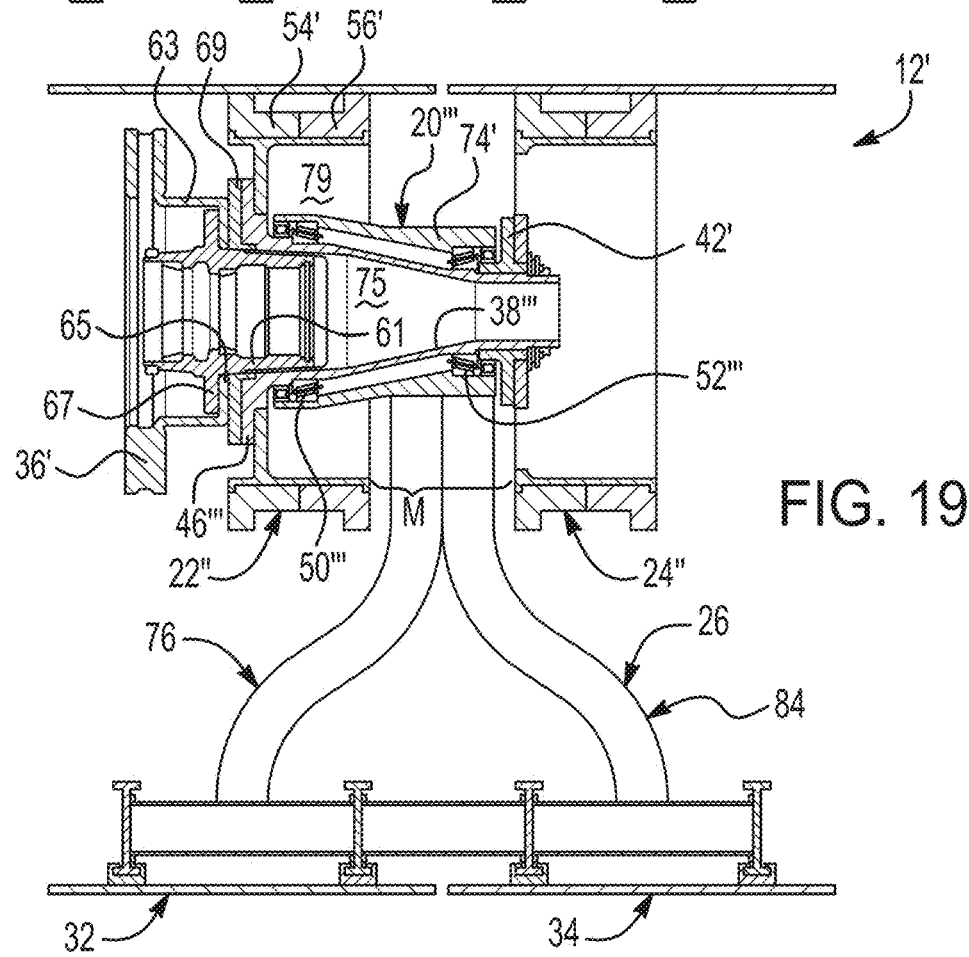
FIG. 19 is a sectional view of certain components of the vehicle track assembly of FIG. 17.
Figure 20:
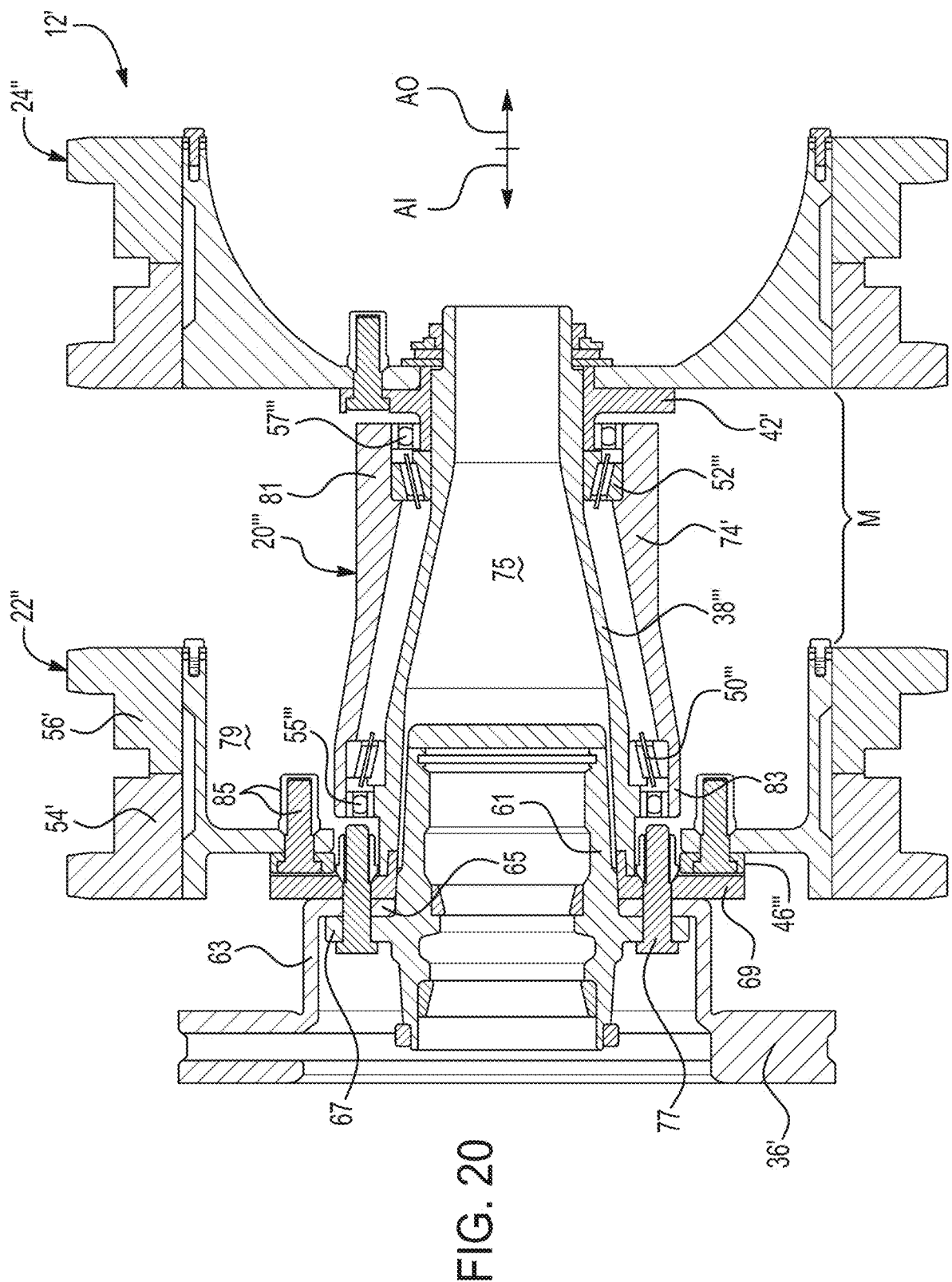
FIG. 20 is a sectional view of the vehicle track assembly of FIG. 17.
Figure 21A:
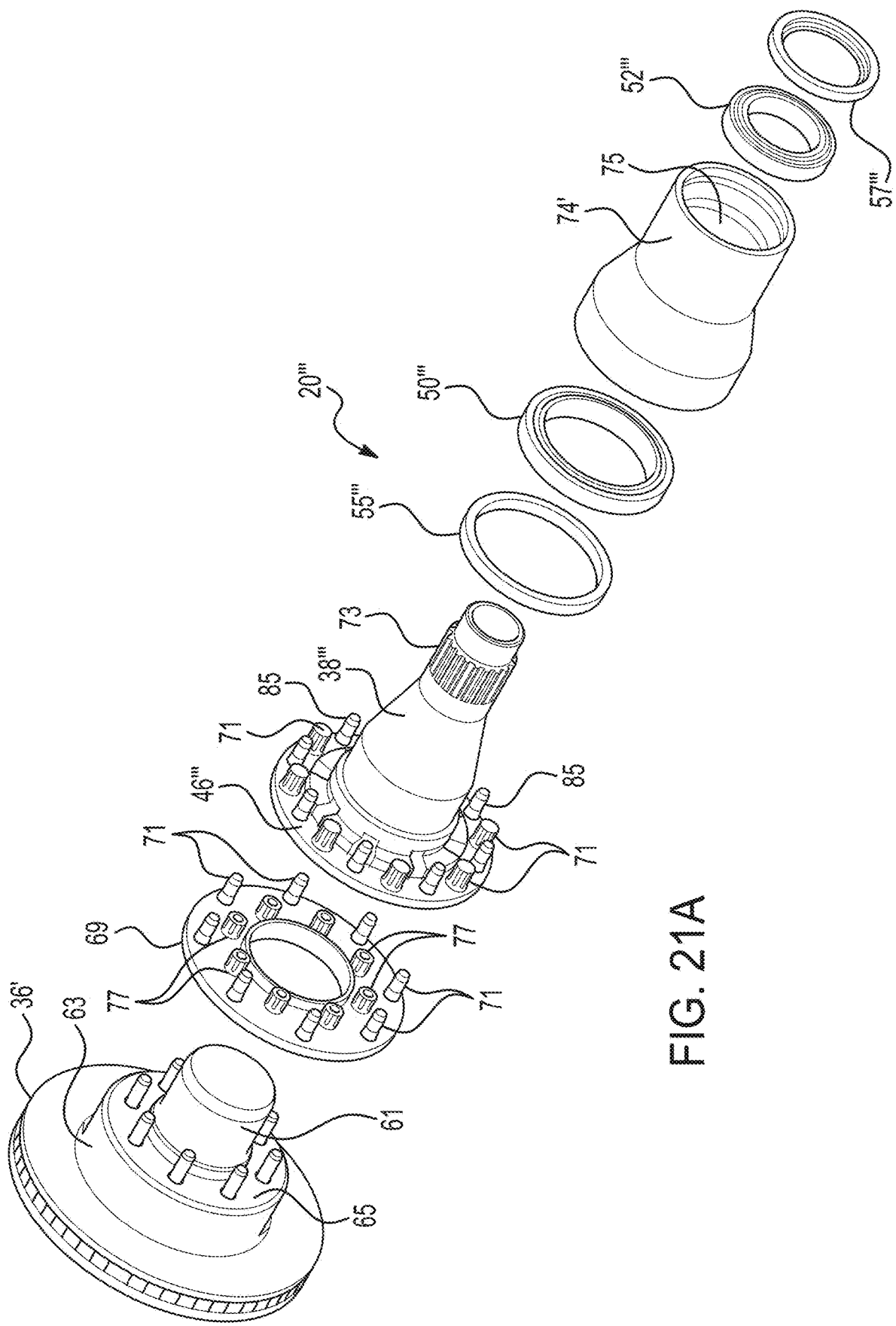
FIG. 21A is an exploded view of a hub assembly of the vehicle track assembly of FIG. 17.
Figure 21B:
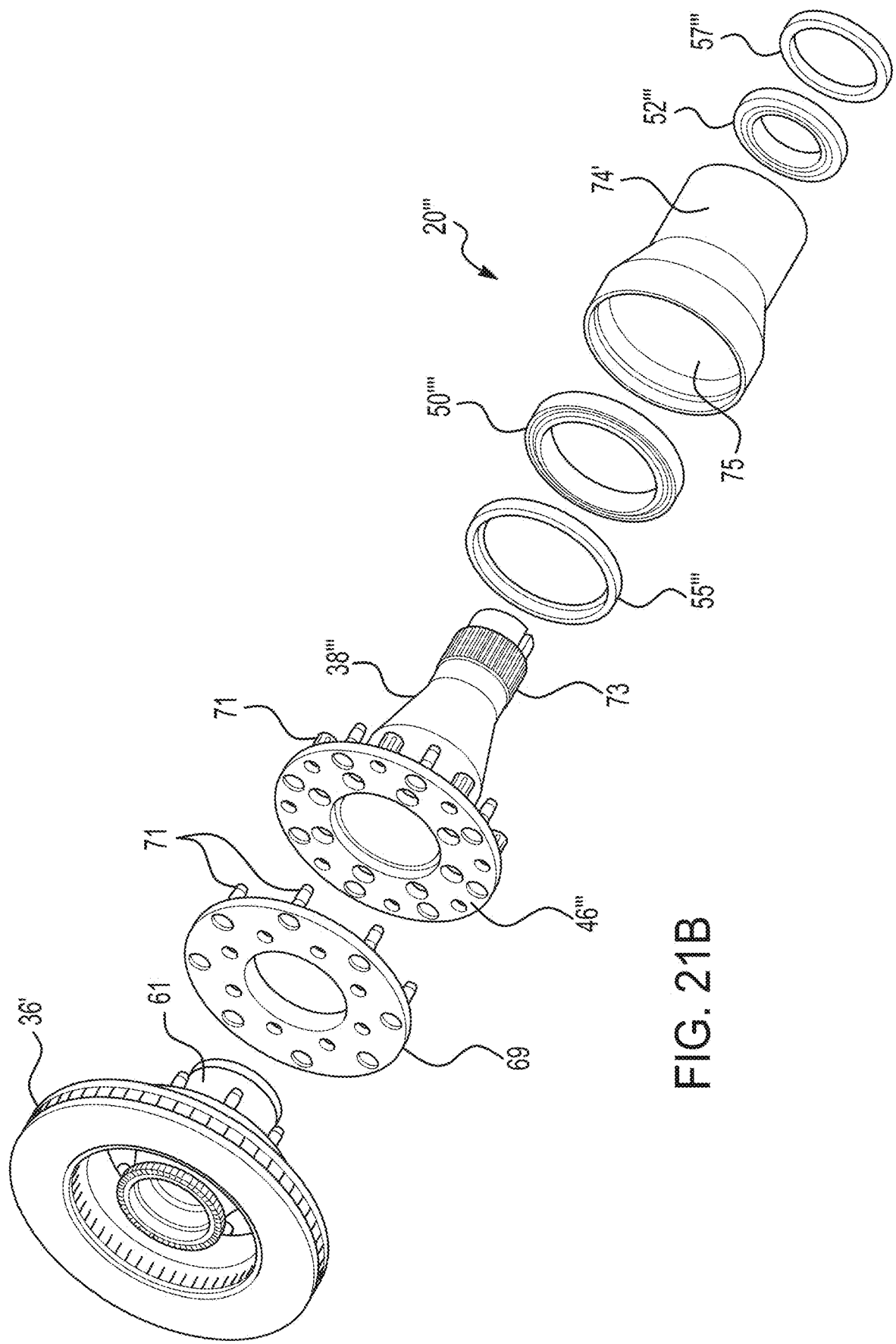
FIG. 21B is another exploded view of the hub assembly of the vehicle track assembly of FIG. 17.

With reference now to FIGS. 19-21, the spindle 38''' is mounted directly to a spacer 69 via a first set of bolts and lug nuts 71, establishing a first bolted connection therebetween at a flanged end 46''' of the spindle 38'''. Opposite the flanged end 46''', the spindle 38''' has a set of external splines 73 for engagement with a set of internal splines of the hub 42'. The spindle 38''' has a hollow interior 75 that spans from a proximal open end at the flanged end 46''', and to a distal open end adjacent the external splines 73. At the proximal open end, the spindle 38''' has a larger diameter in order to fit around an exterior of the hub 61. The hub 61 is received in the interior 75 via the proximal open end, and the spindle 38''' and hub 61 exhibit an axial overlap arrangement relative to each other. At the distal open end, the spindle 38''' has a comparatively smaller diameter than the proximal open end. Between the open ends, the spindle's wall tapers and grows narrower. The spacer 69 may be included as a component of the hub assembly 20'''; still, in other embodiments the spacer 69 may not be provided. The spacer 69 facilitates the transfer of loads axially inboard and in closer proximity to the rotor 36' and to the hub 61. The spacer 69 is mounted directly to the rotor 36' and to the hub 61 via a second set of bolts and lug nuts 77, establishing a second bolted connection therebetween. The second bolted connection is established at the radially-extending flange 67 of the hub 61, and at the radial portion 65 of the rotor 36'. The second bolted connection and the second set of bolts and lug nuts 77 have a radial location that is radially inboard with respect to the first bolted connection and the first set of bolts and lug nuts 71. This arrangement provides ready access to the first set of bolts and lug nuts 71 during assembly and installation procedures of the vehicle track assembly 12' to the automobile 18. The spacer 69 has an annular shape, and is received over the hub 61 in assembly where the spacer 69 is situated axially between the flanged end 46''' of the spindle 38''' and the radial portion 65 of the rotor 36'.

As set forth, the bearing assembly 40''' and the first and second sets of bearings 50''', 52''' play a role in the transfer and transmission of loads exerted amid use of the vehicle track assembly 12'. The second set of bearings 52''' has a similar axial location in this embodiment as in previous embodiments. With particular reference to FIGS. 19 and 20, the second set of bearings 52''' is located and positioned at the axial mid-region M. At this location, the second set of bearings 52''' exhibits an axial overlap arrangement with the location from which the frame 26 and the first and second sets of frame members 76, 84 are connected and initially extend from the base hub 74' (in the fourth embodiment, the frame 26 lacks the third set of frame members 92). The first set of bearings 50''' has an axial location in this embodiment that differs in comparison to the previous embodiments. Its axial location serves to facilitate the transfer of loads axially inboard to a greater degree and in closer proximity to the rotor 36' and in closer proximity to the hub 61. The first set of bearings 50''' is located axially inboard of the axial mid-region M, and lacks the axial overlap arrangement with the frame 26 had by the second set of bearings 52'''. The first set of bearings 50''' resides within a recessed interior 79 of the first driver 22'', and exhibits an axial overlap arrangement with the first driver 22'' and with the first and second trackrings 54', 56'. Moreover, the first set of bearings 50''' axially overlaps and radially surrounds an axial extent and exterior of the hub 61. In order to fit around the exterior of the hub 61, the first set of bearings 50''' has a first diameter that is greater than a second diameter of the second set of bearings 52'''. Further, the hub assembly 20''' of this fourth embodiment includes the first seal 55''' and the second seal 57'''.

The base hub 74' somewhat complements the shape of the spindle 38'''. At a proximal open end, the base hub 74' has a larger diameter in order to fit around an exterior of the hub 61. The hub 61 is received in an interior via the proximal open end, and the base hub 74' and hub 61 exhibit an axial overlap arrangement relative to each other. The proximal open end of the base hub 74' resides within the recessed interior 79 of the first driver 22'', and exhibits an axial overlap arrangement with the first driver 22'' and with the first and second trackrings 54', 56'. At a distal open end, the base hub 74' has a comparatively smaller diameter than the proximal open end. Between the open ends, the base hub's wall tapers and grows narrower. In order to brace loads exerted amid use, a first wall portion adjacent the distal open end and adjacent the second set of bearings 52''' has a radial thickness that is greater than a radial thickness of a second wall portion 83 adjacent the proximal open end and adjacent the first set of bearings 50'''. The first wall portion 81 is a thickened wall portion compared to the second wall portion 83. Lastly, the first driver 22'' is mounted directly to the flanged end 46''' of the spindle 38''' via a third set of bolts and lug nuts 85, establishing a third bolted connection therebetween.

Turning now to FIGS. 22-29, yet another embodiment of the vehicle track assembly is presented. In this embodiment, certain corresponding components and elements of previous embodiments are numbered similarly but with numerals 2xx when referring to this embodiment of FIGS. 22-29. For example, the vehicle track assembly is referenced by numeral 12 in previous embodiments, and is correspondingly referenced by numeral 212 in the embodiment of FIGS. 22-29. Moreover, similarities exist between previous embodiments and this embodiment of FIGS. 22-29, some of which may not be repeated here in the description of the embodiment of FIGS. 22-29. At least certain appreciable differences between the embodiments are described. One notable difference with the embodiment of FIGS. 22-29 is that the vehicle track assembly 212 is designed and constructed as a single-track arrangement, as described below.

As before, in installation the vehicle track assembly 212 can be mounted to a hub of an automobile and/or could be mounted to other vehicle components of the automobile. In this embodiment, the vehicle track assembly 212 includes a frame base hub 274, a bearing assembly 240 with a first set of bearings 250 and a second set of bearings 252, a spindle 238, a first driver 227, a second driver 229, a drive sleeve 249, a spacer 287, a frame 226, a single rail 231, and a single track 233.

Figure 22:
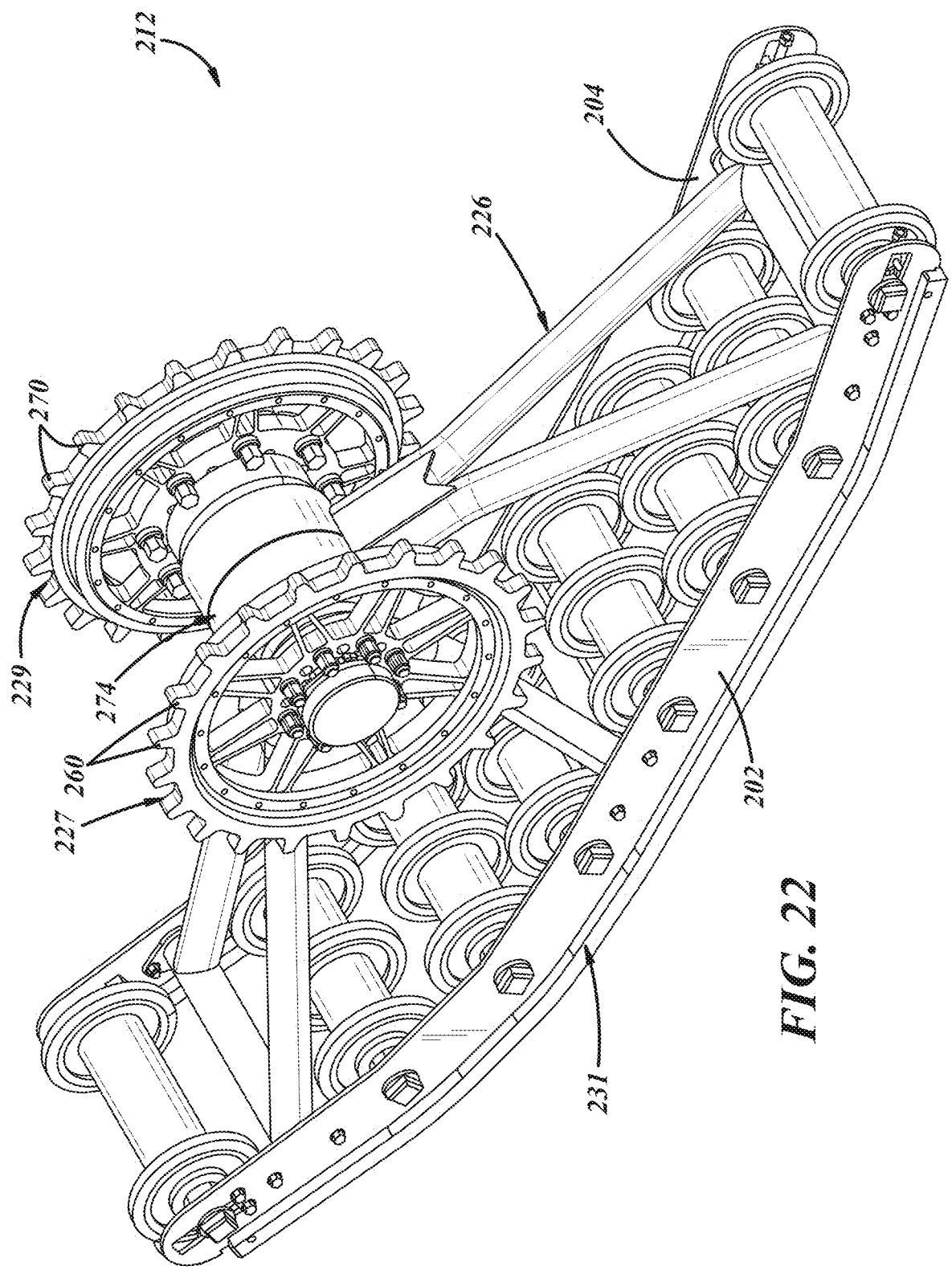
FIG. 22 is a perspective view of an embodiment of a vehicle track assembly, this embodiment is intended for installation at a front end and drive-side of a vehicle.
Figure 23:
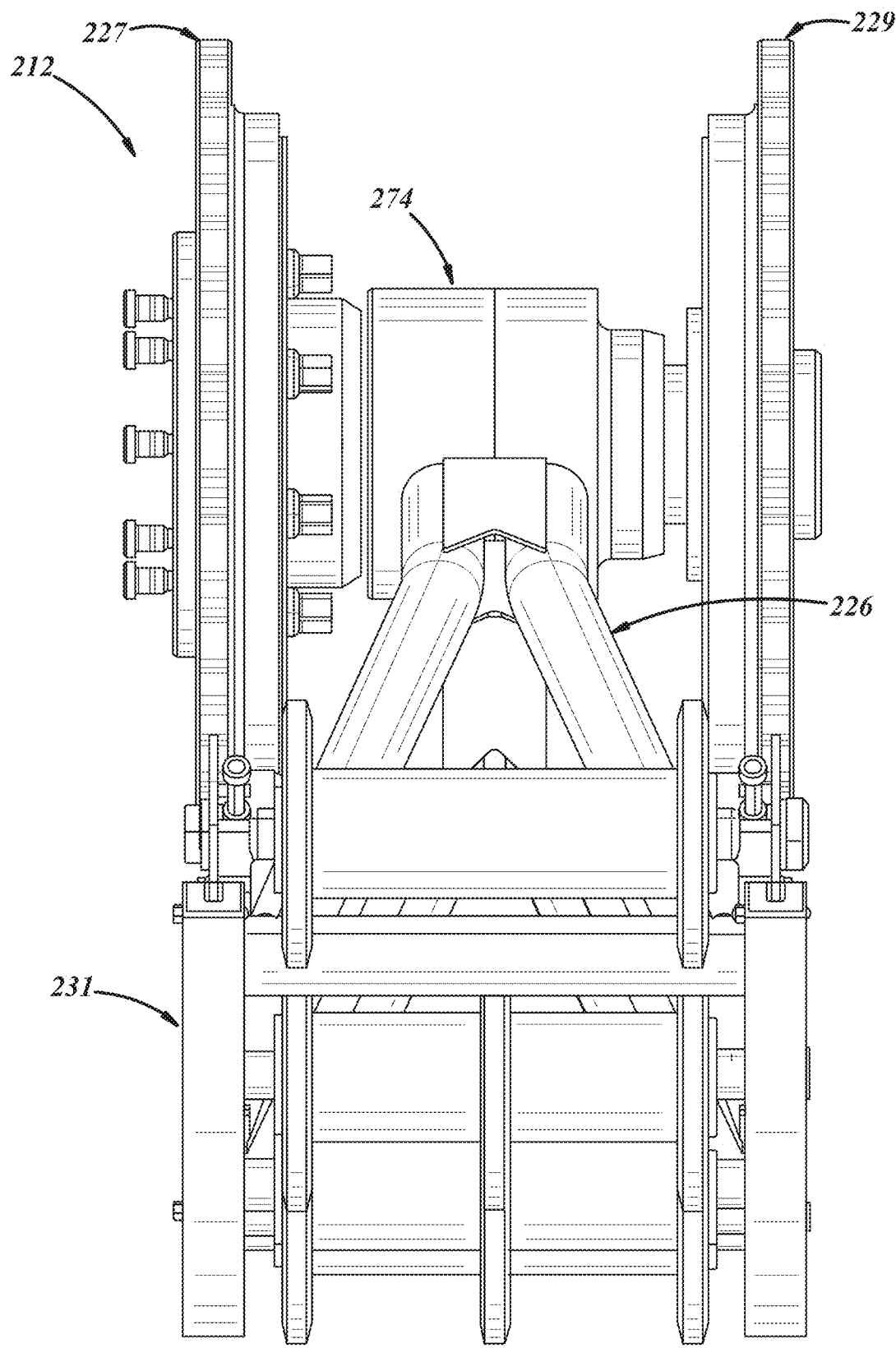
FIG. 23 is a front view of the vehicle track assembly of FIG. 22.
Figure 24:
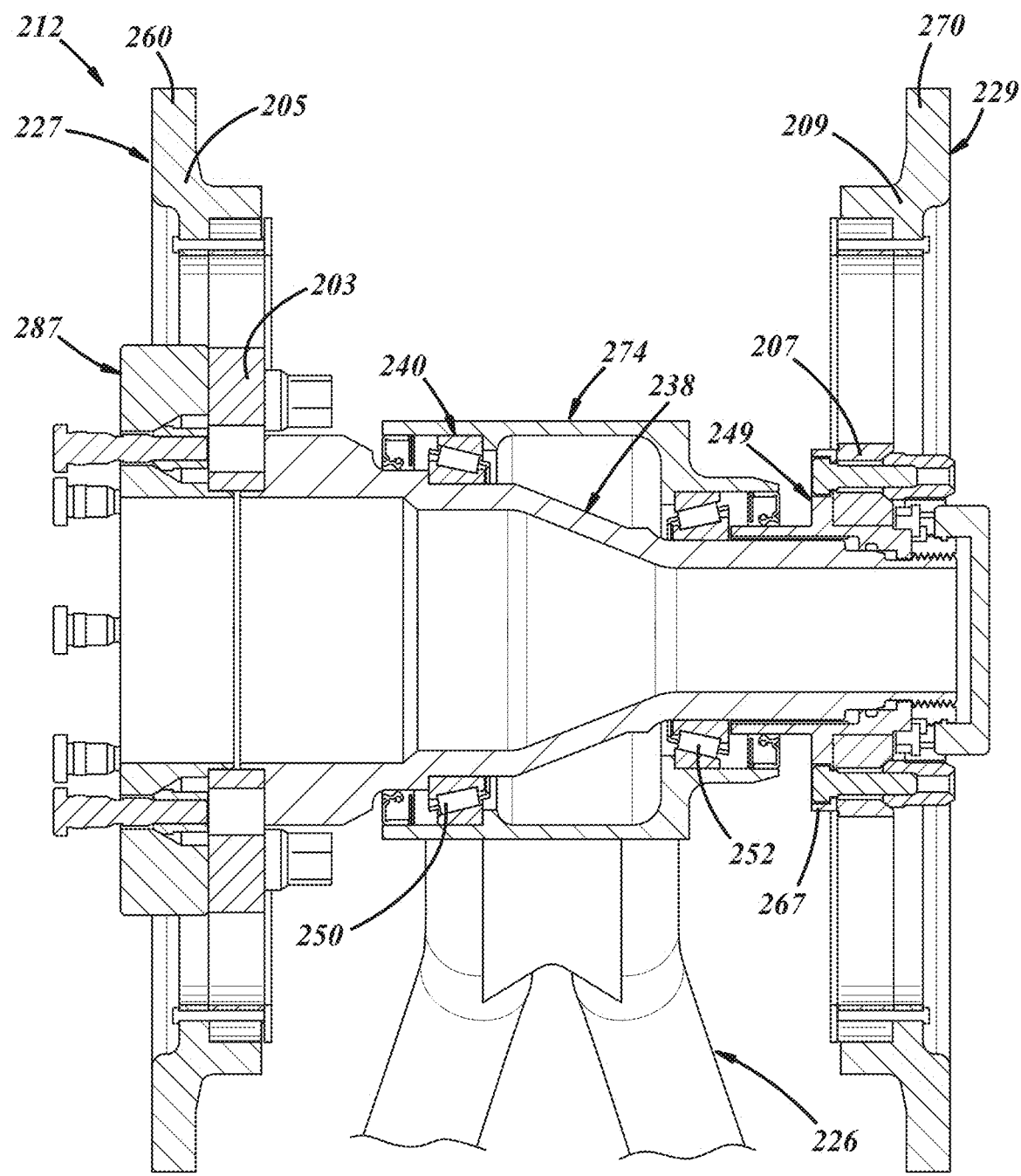
FIG. 24 is a cross-sectional view of the vehicle track assembly of FIG. 22.
Figure 25B:
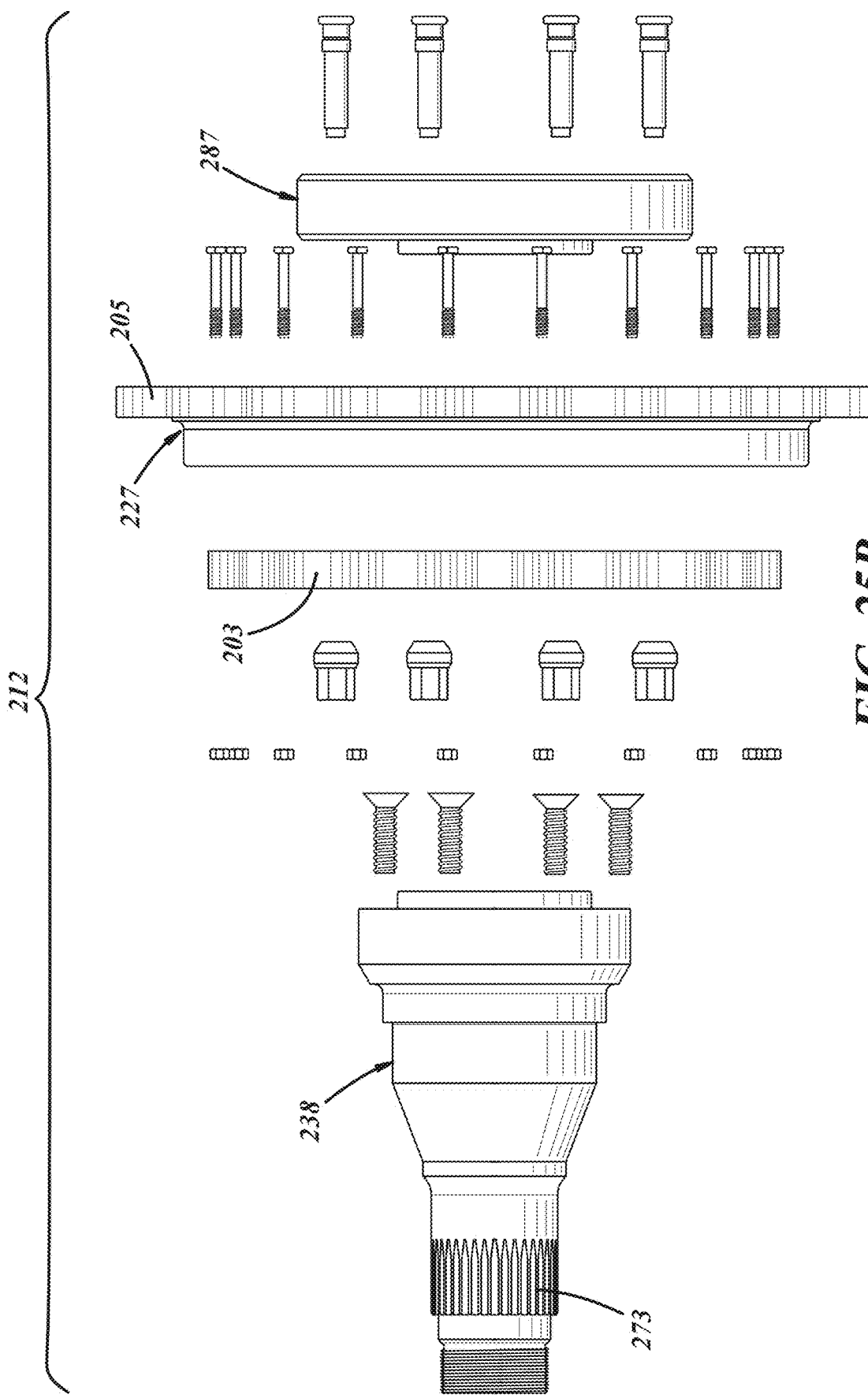
FIG. 25B is an exploded side view of certain other components of the vehicle track assembly of FIG. 22.
Figure 26A:
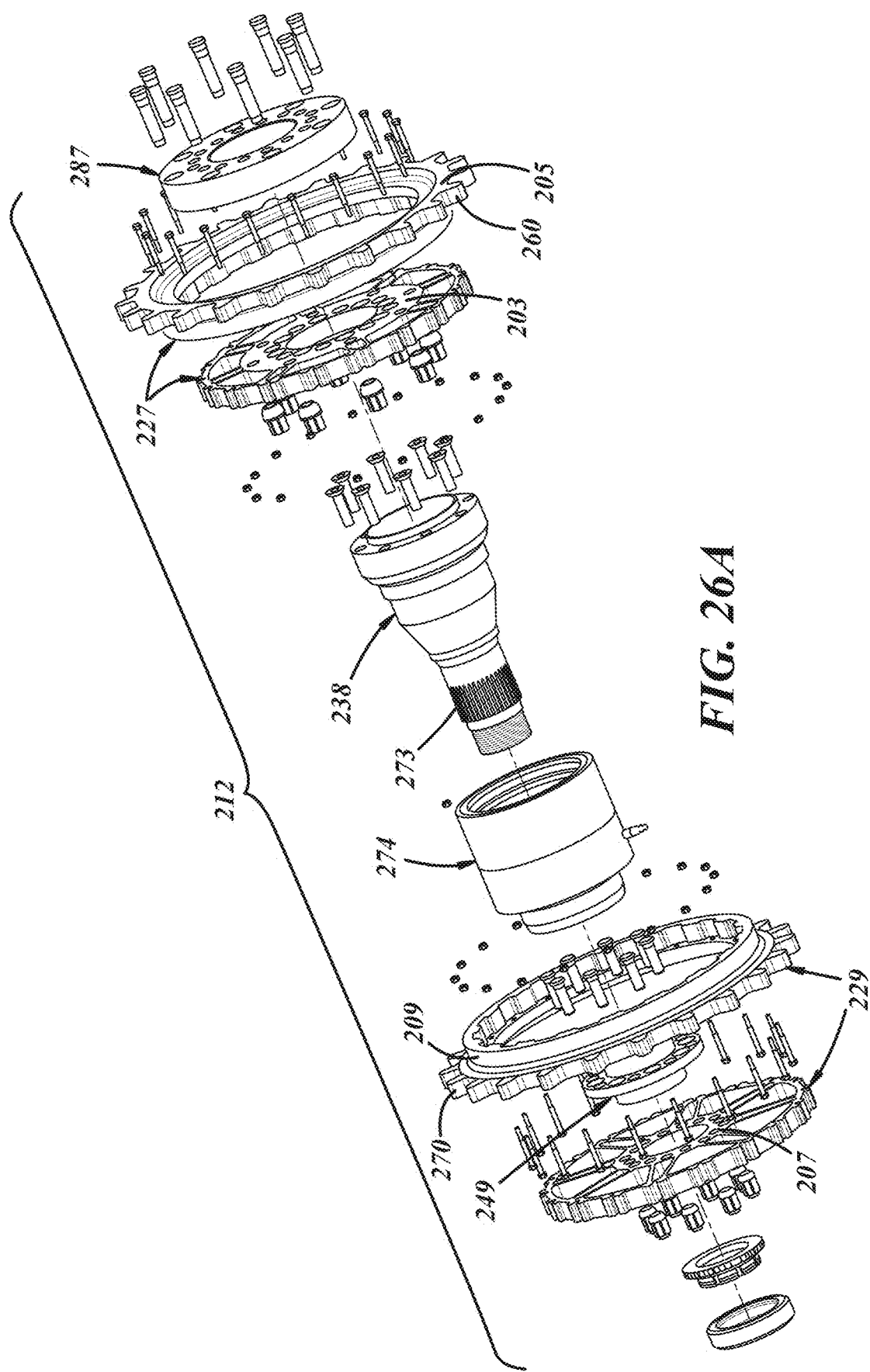
FIG. 26A is an exploded view of the vehicle track assembly of FIG. 22 from a first perspective.
Figure 26B:
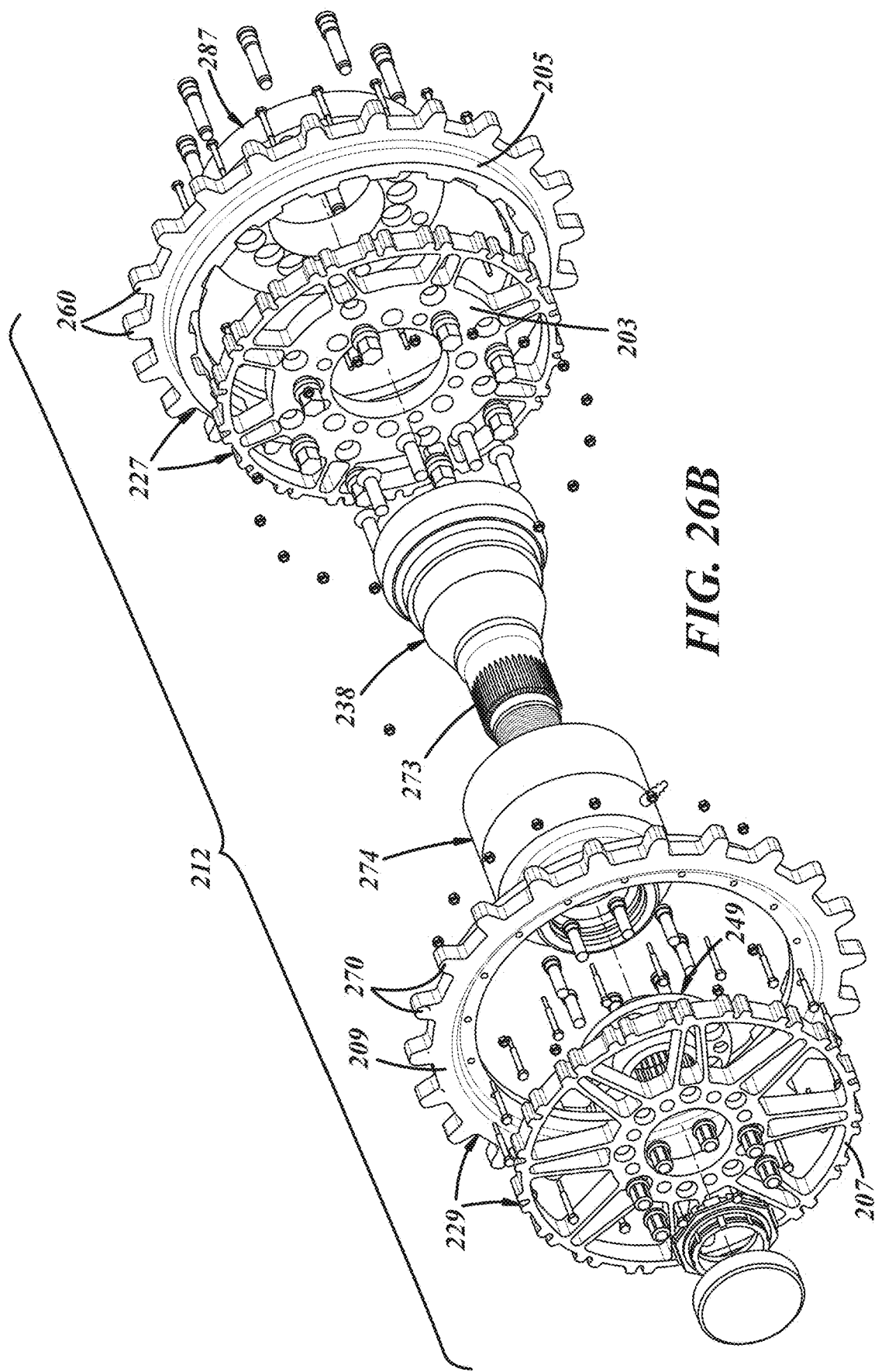
FIG. 26B is an exploded view of the vehicle track assembly of FIG. 22 from a second perspective.

With particular reference to FIG. 24, as before, a section of the spindle 238 is inserted and received within a hollow interior of the frame base hub 274, and the bearing assembly 240 and the first and second sets of bearings 250, 252 are housed by the base hub 274. The bearing assembly 240 and the first and second sets of bearings 250, 252 are situated radially between the spindle 238 and the frame base hub 274. Further, FIGS. 22 and 23 depict a number of frame members that extend from the frame base hub 274 and to the single rail 231. The frame members can be welded to the frame base hub 274 and can have bolted connections to the single rail 231. Side-by-side and neighboring individual frame members establish A-frame structures that constitute a wishbone construction, as previously set forth. It has been shown that such A-frame structures and wishbone constructions serve to more readily endure and bear expected loads that are often experienced during use of the vehicle track assembly 212 in off-road conditions. The single rail 231 serves to guide the single track 233 as the single track 233 moves across the underlying ground. The single rail 231 includes a first side rail 202 and a second side rail 204.

Figure 29:
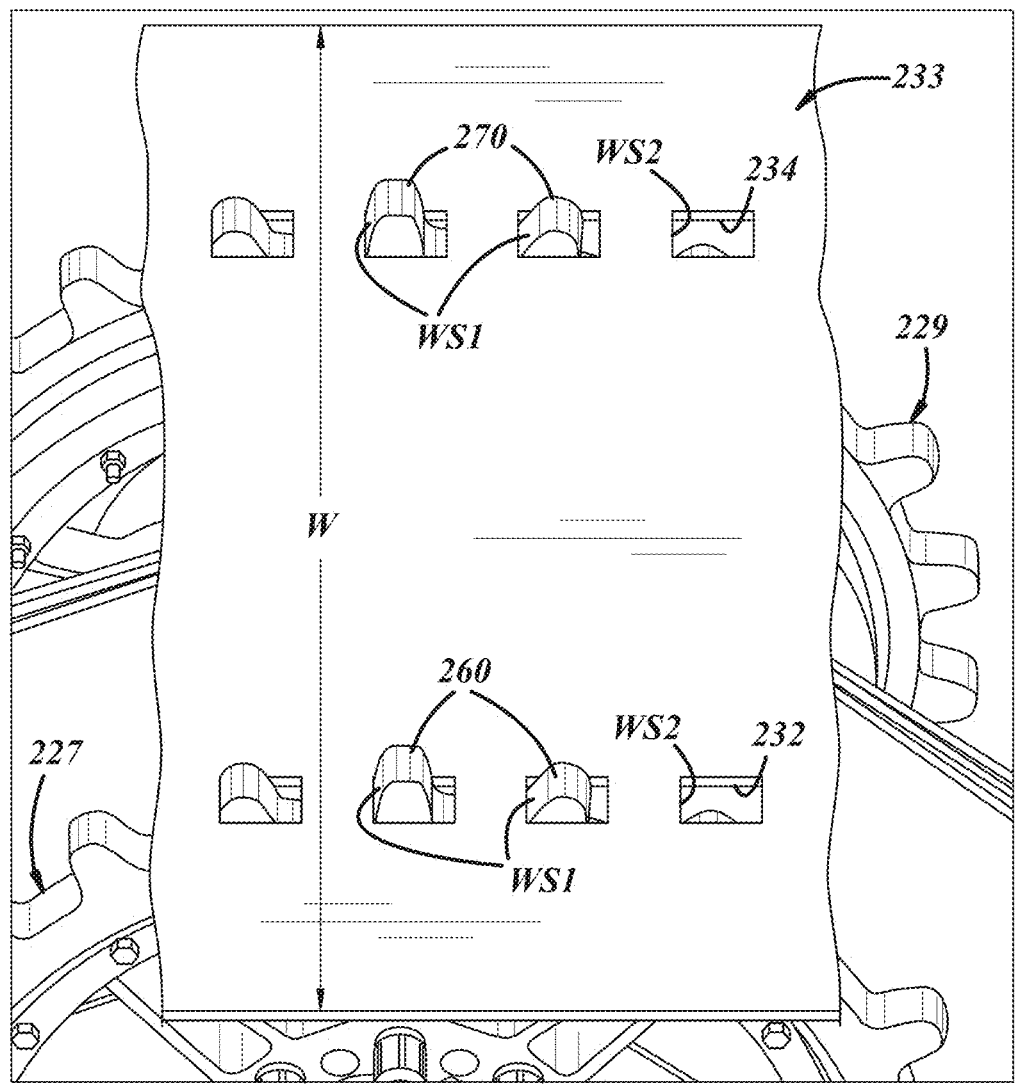
FIG. 29 is an enlarged and segmented view of an embodiment of a single track of the vehicle track assembly of FIG. 22.

Furthermore, the single track 233 is driven to move via the first and second drivers 227, 229 and makes direct contact with the grounds lying beneath the vehicle track assembly 212. With reference now to FIG. 29, as before, the single track 233 has an endless loop structure that spans around the exterior of the vehicle track assembly 212. The single track 233 can be composed of a hard rubber material. A first set of slots 232 resides in, and is defined in, the single track 233, and a second set of slots 234 resides in, and is defined in, the single track 233. The first and second sets of slots 232, 234 receive recurring insertion of discrete sets of teeth (introduced below) of the first and second drivers 227, 229 amid use of the vehicle track assembly 212 and during driven movement of the single track 233 and for driving engagement thereamong. The first and second sets of slots 232, 234 have individual slots spaced apart from one another and that span wholly around the single track 233 over its full longitudinal extent. Individual slots are sized for receipt of individual teeth. With respect to each other, the first and second sets of slots 232, 234 are spaced laterally apart and adjacent opposite lateral sides of the single track 233. The first and second sets of slots 232, 234 can span wholly through the structure of the single track 233, establishing a window of sorts, as shown in FIG. 29; but in other embodiments the slots need not necessarily span wholly through the single track structure and rather could be formed via lugs or other structures located in the single track; in this regard, the term "slot" and its grammatical variations is intended to have a more expansive meaning.

Figure 30:
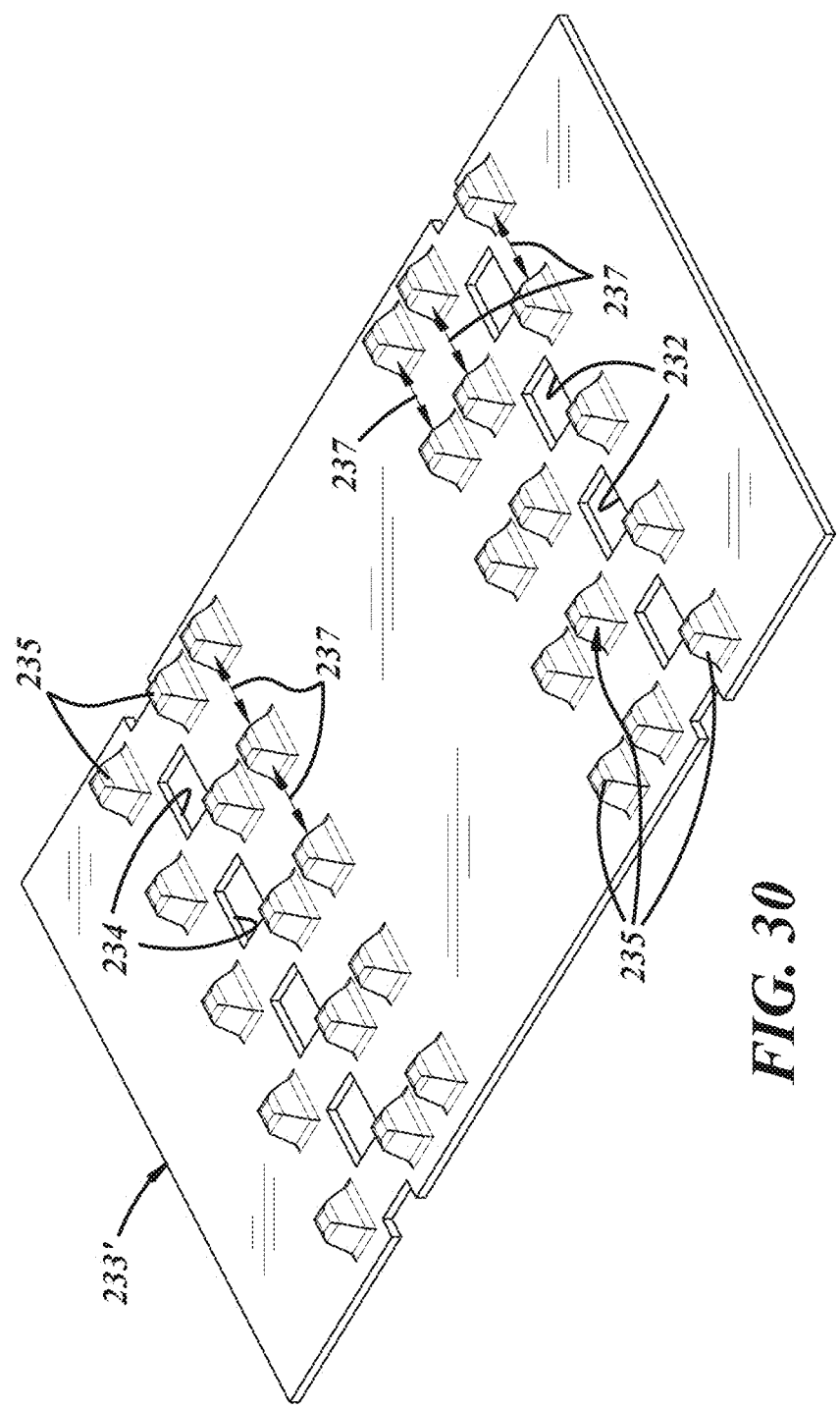
FIG. 30 is an enlarged and segmented view of another embodiment of a single track of the vehicle track assembly of FIG. 22.

In another embodiment of the single track 233' depicted in FIG. 30, the single track 233' has sets of lugs 235 located on a working or an underside surface of the single track 233' that confronts the vehicle track assembly 212. The lugs 235 come into engagement and intermittently meshing with corresponding lugs (introduced below) of the first and second drivers 227', 229'. Individual lugs 235 are spaced apart from one another and span wholly around the single track 233' over the track's full longitudinal extent. There can be a single set of lugs 235, or multiple sets of lugs 235 as shown in FIG. 30. Between neighboring lugs 235, slots 237 are established for receipt of recurring insertion of the corresponding lugs of the first and second drivers 227', 229' amid use of the vehicle track assembly 212 and during driven movement of the single track 233' and for driving engagement thereamong. The examples of FIGS. 29 and 30 are intended to demonstrate that the slots can come in various forms, shapes, and sizes in various embodiments. A lateral width W (FIG. 29) of the single track 233 can range between approximately twenty-one and sixty inches (21-60"), and can measure approximately twenty-four inches (24"), per various examples; still, in other examples the lateral width W can have other ranges and be more or less in value. The single track 233 constitutes the single-track arrangement of the vehicle track assembly 212—in other words, the vehicle track assembly 212, in contrast to previous embodiments, has one track component in its construction and design for traction and floatation of the accompanying vehicle and the ability to travel over more extreme conditions than past systems and assemblies. It has been shown that the overall design, construction, and components of the vehicle track assembly 212 facilitates its traction and floatation capabilities.

Figure 31:
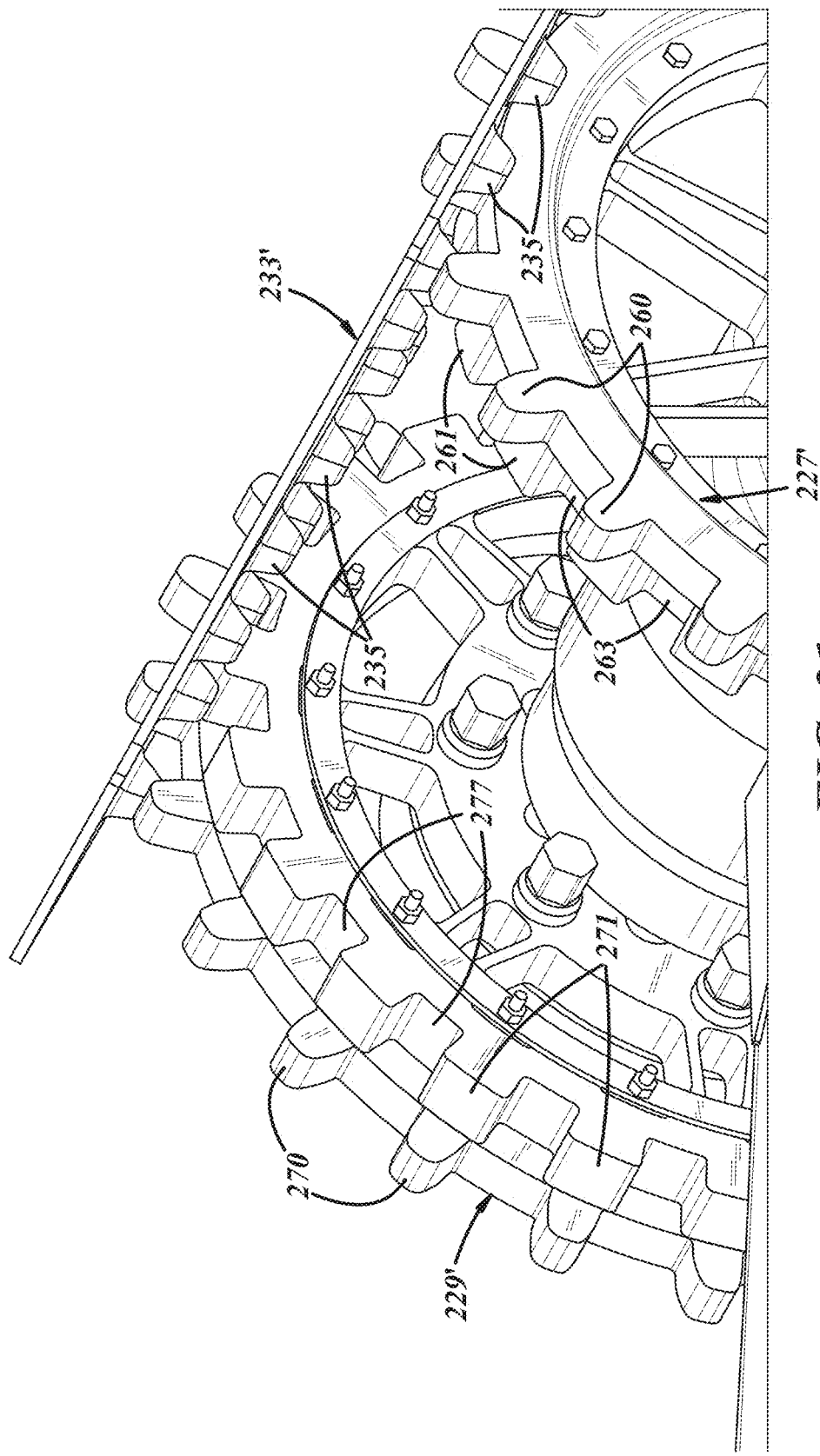
FIG. 31 is an enlarged and segmented view of the single track of FIG. 30 and an embodiment of drivers with lugs.

With general reference now to FIGS. 24, 25B, 26A, and 26B, the spindle 238 is driven to rotate and, in turn, drives rapid rotation of the first and second drivers 227, 229 during use of the vehicle track assembly 212. The spindle 238 has a connection with the first driver 227 at one end, and has a spline-to-spline engagement with the drive sleeve 249 at its opposite end. The connection between the spindle 238 and first driver 227 is a bolted connection according to this embodiment. For the splined engagement, the spindle 238 has a first set of splines 273 which are external splines. The first set of splines 273 is arranged axially on the spindle's end and spans wholly circumferentially therearound. The first driver 227 drives movement of the single track 233 at one lateral side of the single track 233. In this embodiment, the first driver 227 has a two-part construction that includes a first driver hub 203 and a first driver trackring 205. The first driver hub 203 can be composed of a metal material such as an aluminum material, and the first driver trackring 205, on the other hand, can be composed of a hard plastic material. Still, other constructions and material compositions are possible in other embodiments; for example, the first driver could have a one-piece, unitary construction composed of a single material such as a metal material or a hard plastic material. Further, the first driver 227 has a first set of teeth 260. The first set of teeth 260 are intermittently inserted into the first set of slots 232 of the single track 233 amid use of the vehicle track assembly 212 and during driven movement of the single track 233 and for driving engagement thereamong. The first set of teeth 260 has individual teeth that span wholly circumferentially around the first driver 227. In this embodiment of the two-part construction, the first driver hub 203 is connected to the spindle 238 and the first driver trackring 205 has the first set of teeth 260. The first set of teeth 260 extends from the first driver trackring 205. The term "teeth" and its grammatical variations is intended to have a more expansive meaning than that demonstrated by the example here. In another embodiment of the first driver 227' depicted in FIG. 31, the first set of teeth 260 includes a first set of lugs 261 for engagement and intermittently meshing with the lugs 235 and slots 237 of the single track 233' amid use of the vehicle track assembly 212 and during driven movement of the single track 233' and for driving engagement thereamong, per this embodiment. Individual lugs 261 span wholly circumferentially around the first driver 227. Between neighboring lugs 261, slots 263 are established for receipt of recurring insertion of the lugs 235 of the single track 233' amid use of the vehicle track assembly 212 and during driven movement of the single track 233' and for driving engagement thereamong. The examples of the figures are intended to demonstrate that the teeth can come in various forms, shapes, and sizes in various embodiments, including in the form of lugs and other constructions.

Similarly, in this embodiment, the second driver 229' has a two-part construction that includes a second driver hub 207 and a second driver trackring 209. The second driver hub 207 can be composed of a metal material such as an aluminum material, and the second driver trackring 209, on the other hand, can be composed of a hard plastic material. Still, other constructions and material compositions are possible in other embodiments; for example, the second driver could have a one-piece, unitary construction composed of a single material such as a metal material or a hard plastic material. Further, the second driver 229' has a second set of teeth 270. The second set of teeth 270 are intermittently inserted into the second set of slots 234 of the single track 233' amid use of the vehicle track assembly 212 and during driven movement of the single track 233'. The second set of teeth 270 has individual teeth that span wholly circumferentially around the second driver 229'. In this embodiment of the two-part construction, the second driver hub 207 has a connection with the drive sleeve 249 and the second driver trackring 209 has the second set of teeth 270. The connection between the second driver hub 207 and drive sleeve 249 is a bolted connection according to this embodiment. The second set of teeth 270 extends from the second driver trackring 209. In another embodiment of the second driver 229' depicted in FIG. 31, the second set of teeth 270 includes a second set of lugs 271 for engagement and intermittently meshing with the lugs 235 and slots 237 of the single track 233' amid use of the vehicle track assembly 212 and during driven movement of the single track 233' and for driving engagement thereamong, per this embodiment. Individual lugs 271 span wholly circumferentially around the second driver 229'. Between neighboring lugs 271, slots 277 are established for receipt of recurring insertion of the lugs 235 of the single track 233' amid use of the vehicle track assembly 212 and during driven movement of the single track 233' and for driving engagement thereamong. The examples of the figures are intended to demonstrate that the teeth can come in various forms, shapes, and sizes in various embodiments, including in the form of lugs and other constructions.

With general reference now to FIGS. 24, 25A, 25B, 26A, 26B, and 28 the drive sleeve 249 is driven to rotate by the spindle 238 and, in turn, drives rotation of the second driver 229 during use of the vehicle track assembly 212. For the splined engagement with the spindle 238, the drive sleeve 249 has a second set of splines 275 which are internal splines. The second set of splines 275 spans wholly circumferentially around the drive sleeve 249. The second set of splines 275 makes spline-to-spline engagement with the first set of splines 273 of the spindle 238 upon their assembly. Further, the drive sleeve 249 has a flange 267 that extends radially-outwardly from a main body of the drive sleeve 249. The flange 267 receives the connection with the second driver hub 207. Still further, situated opposite the drive sleeve 249 relative to the spindle 238, the spacer 287 is connected to the first driver 227. The connection between the spacer 287 and first driver 227 is a bolted connection according to this embodiment. Moreover, upon installation of the vehicle track assembly 212 on an accompanying vehicle such as the automobile 18, the spacer 287 has a connection with a vehicle component. That connection is a bolted connection according to this embodiment.

Since both of the first and second drivers 227, 229 drive movement of the single track 233—and since the first and second drivers 227, 229 are discrete components with respect to each other and have separate locations with respect to each other and are separated from each other relative to other components (e.g., spindle 238, drive sleeve 249) of the vehicle track assembly 212—it has been determined that simultaneous and concurrent driving engagement should occur between the first set of teeth 260 and first set of slots 232 and the second set of teeth 270 and second set of slots 234 in order to ensure intended and effective driving movement of the single track 233. In various embodiments, such simultaneous and concurrent driving engagement should occur between various driving components which could include teeth, slots, lugs, and/or other constructions (the teeth and slot driving engagement is described here for demonstrative purposes, although applicable to other driving engagements among other driving components and constructions). Otherwise, when the teeth of the first and second drivers 227, 229 come into engagement with respective slots of the single track 233 at different and incongruent times, it has been shown that the single track 233 can experience a binding condition or can experience some other unintended consequence. To more readily enable proper concurrent teeth-to-slot engagement, the first and second drivers 227, 229 and their respective first and second sets of teeth 260, 270 should exhibit rotational alignment relative to each other, and their angular orientation and timing should be synchronized. FIG. 29 illustrates such proper teeth-to-slot engagement and driver rotational alignment. The figure demonstrates that working surfaces WS1 of the first and second set of teeth 260, 270 concurrently make contact with working surfaces WS2 of the first and second sets of slots 232, 234.

Some or more of the components of the vehicle track assembly 212 are furnished with one or more clocking indicia in order to facilitate proper teeth-to-slot engagement (or other driving engagement among other driving components and constructions) and driver rotational alignment, and hence more readily preclude the unwanted binding condition or other shortcoming. The clocking indicia serves to inform an assembler, installer, or other user of the vehicle track assembly 212 of the proper and intended angular orientation of the components with respect to one another. The clocking indicia are markings or other indications affixed in place on the components of the vehicle track assembly 212 that, once brought into rotational alignment with one another, concomitantly rotationally aligns the first and second drivers 227, 229 and enables simultaneous teeth-to-slot engagement among the first and second sets of teeth 260, 270 and first and second sets of slots 232, 234. In this embodiment, and with reference now to FIGS. 27 and 28, the clocking indicia is in the form of a small hole or other indentation physically made into the component's structure; still, other types of markings and indications are possible in other embodiments including those that need not necessarily be permanent in nature and rather could be semi-permanent and/or removed post-assembly/installation.

Figure 27:
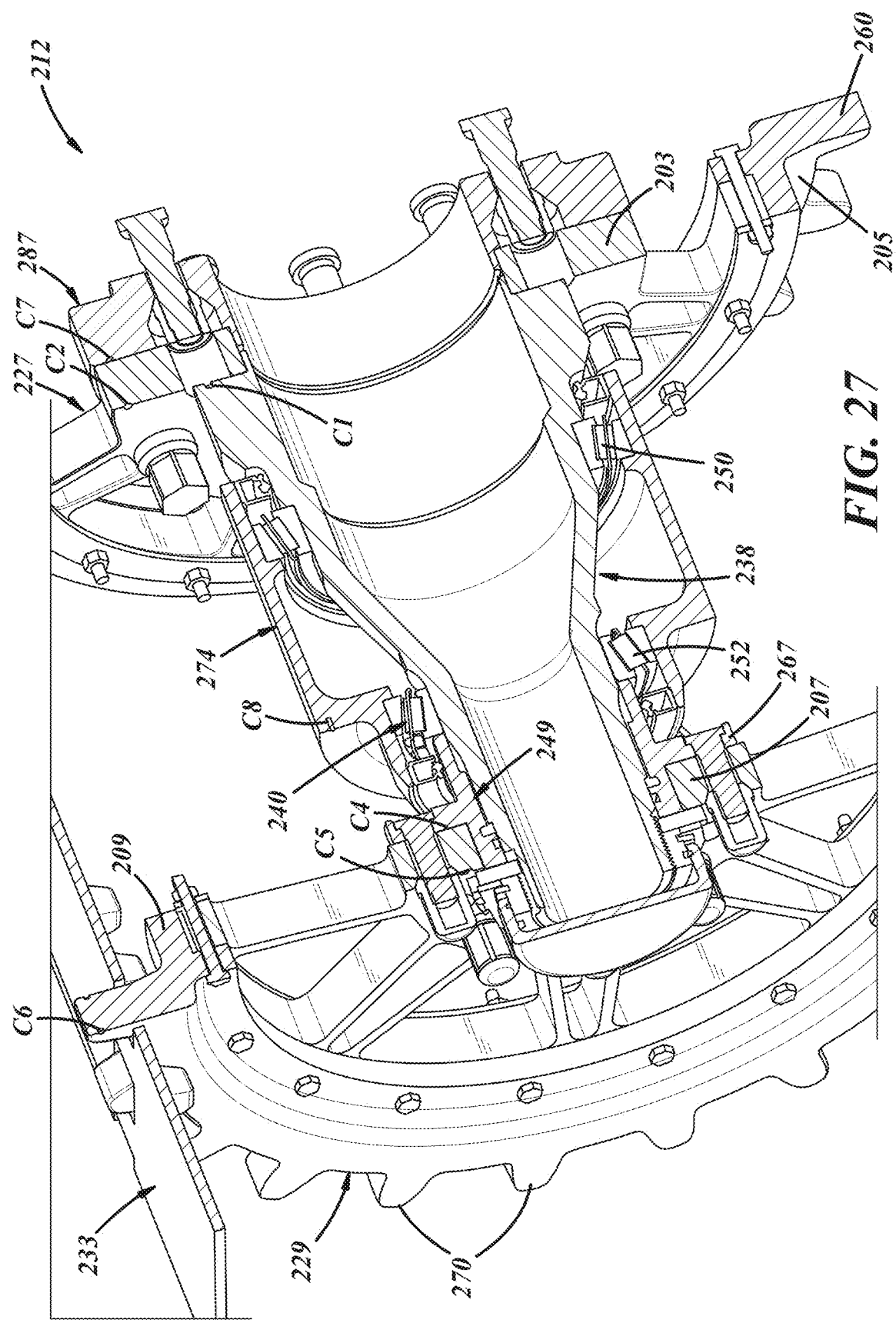
FIG. 27 is another cross-sectional view of the vehicle track assembly of FIG. 22.
Figure 28:
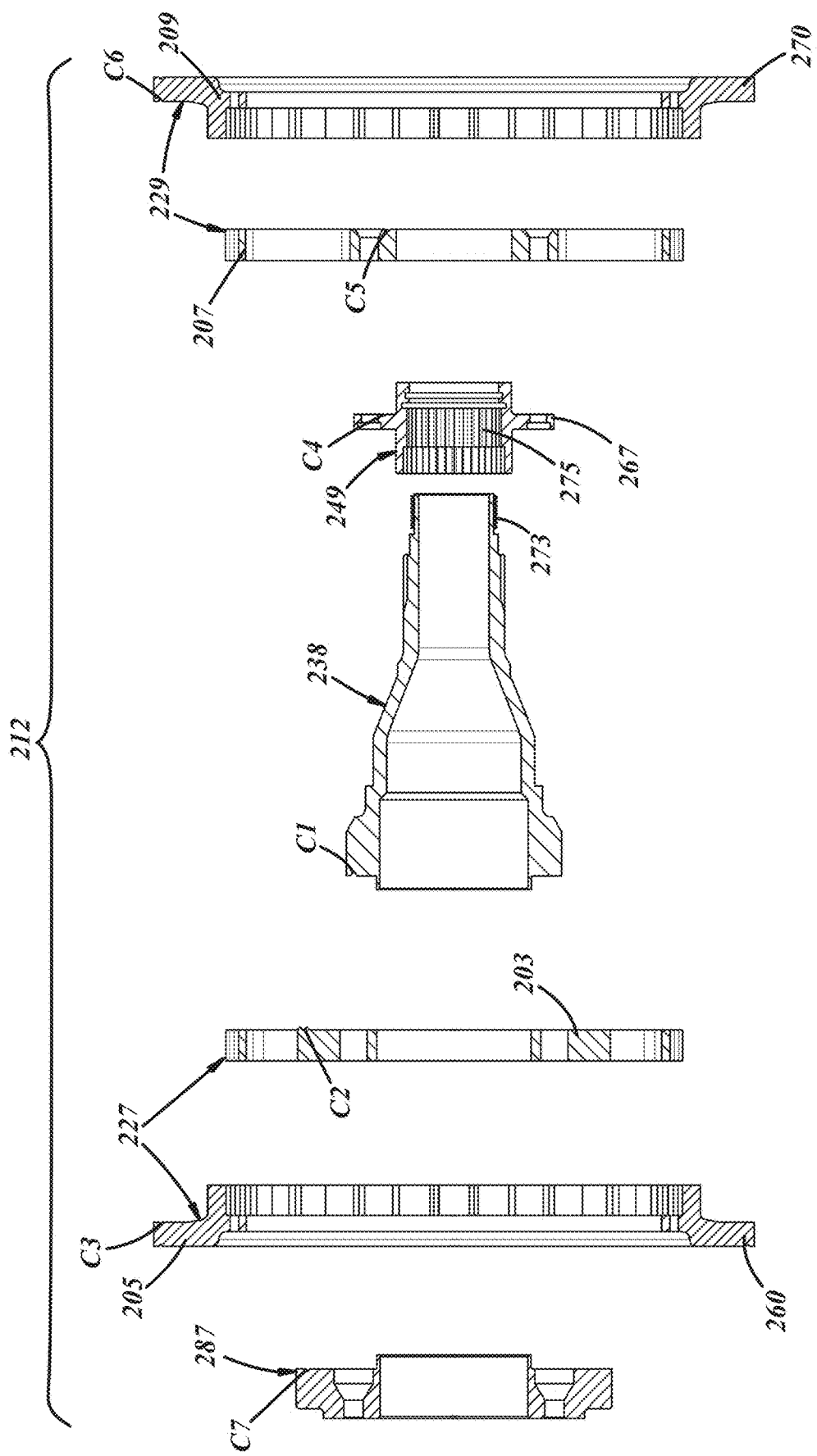
FIG. 28 is an exploded view of certain components in cross-section of the vehicle track assembly of FIG. 22.

In this embodiment, the spindle 238 is equipped with a first clocking indicia C1. The first clocking indicia C1 can constitute a top dead center of the spindle 238 upon assembly, as shown, and resides at an exterior surface of the spindle 238 where it is visible and can be viewed by the assembler/installer/user. In the embodiment shown, the first clocking indicia C1 is located at an axially-facing exterior surface of the spindle 238. Further, since the first driver 227 has the two-part construction, both of its component can be furnished with clocking indicia; otherwise, for an embodiment of one-piece construction, a single clocking indicia would be provided for the first driver 227. In FIGS. 27 and 28, the first driver hub 203 has a second clocking indicia C2 and the first driver trackring 205 has a third clocking indicia C3. The second and third clocking indicia C2, C3 can constitute top dead centers of the respective first driver hub 203 and first driver trackring 205 upon assembly, as shown, and reside at exterior surfaces of the respective components where they are somewhat readily visible and viewable. According to this embodiment, the second and third clocking indicia C2, C3 are located at axially-facing exterior surfaces of the first driver hub and trackring 203, 205. Yet further in this embodiment, the drive sleeve 249 has a fourth clocking indicia C4. The fourth clocking indicia C4 can constitute a top dead center of the drive sleeve 249 upon assembly, as shown, and resides at an exterior surface of the drive sleeve 249 where it is somewhat readily visible and viewable. According to this embodiment, the fourth clocking indicia C4 is located at an axially-facing exterior surface of the flange 267 of the drive sleeve 249.

Further, similar to the first driver 227, the second driver 229 in this embodiment has two clocking indicia but could have one. The second driver hub 207 has a fifth clocking indicia C5 and the second driver trackring 209 has a sixth clocking indicia C6. The fifth and sixth clocking indicia C5, C6 can constitute top dead centers of the respective second driver hub 207 and second driver trackring 209 upon assembly, as shown, and reside at exterior surfaces of the respective components where they are somewhat readily visible and viewable. Per this embodiment, the fifth and sixth clocking indicia C5, C6 are located at axially-facing exterior surfaces of the second driver hub and trackring 207, 209. Furthermore, the spacer 287 can have a seventh clocking indicia C7 per an embodiment. The seventh clocking indicia C7 can constitute a top dead center of the spacer 287 upon assembly, as shown, and resides at an exterior surface of the spacer 287 where it is somewhat readily visible and viewable. According to this embodiment, the seventh clocking indicia C7 is located at axially-facing exterior surfaces of the spacer 287. Lastly, and with specific reference to FIG. 27, the frame base hub 274 can have an eighth clocking indicia C8 per an embodiment. The eighth clocking indicia C8 can constitute a top dead center of the frame base hub 274 upon assembly, as shown, and resides at an exterior surface of the frame base hub 274 where it is somewhat readily visible and viewable. According to this embodiment, the eighth clocking indicia C8 is located at an axially-facing exterior surface of the frame base hub 274.

Still, in certain embodiments, only certain components can be furnished with a clocking indicia in order to facilitate proper concurrent teeth-to-slot (or other driving component and construction) engagement and driver rotational alignment. In an embodiment, for instance, the spindle 238 and drive sleeve 249 can be provided with clocking indicia in order to rotationally align the spindle 238 and drive sleeve 249 with respect to each other upon spline-to-spline engagement. The first set of splines 273 can be arranged in rotation with respect to the second set of splines 275 as the components are brought together in assembly to rotationally align the spindle 238 and drive sleeve 249 relative to each other. The remaining components, per this embodiment, could then be bolted in place to their respective components. Here, since engagement between the first set of splines 273 and second set of splines 275 has more than one rotational fit among the splines, providing the clocking indicia at the spindle 238 and at the drive sleeve 249 serves to enable arrangement of these components in proper rotational alignment relative to each other that, in turn, properly rotationally aligns downstream components connected to them and connected to one another, and hence facilitates proper teeth-to-slot (or other driving component and construction) engagement and driver rotational alignment, more readily precluding the unwanted binding condition or other shortcoming.

In general, while a multitude of embodiments have been depicted and described with a multitude of components and steps in each embodiment, in alternative embodiments of the vehicle track assembly and accompanying method the components and steps of various embodiments could be intermixed, combined, and/or exchanged for one another. In other words, components and/or steps described in connection with a particular embodiment are not necessarily exclusive to that particular embodiment.

As used herein, the terms "general," "generally," "approximately," and "substantially" are intended to account for the inherent degree of variance and imprecision that is often attributed to, and often accompanies, any design and manufacturing process and measurement, including engineering tolerances, and without deviation from the relevant functionality and intended outcome, such that mathematical precision and exactitude is not implied and, in some instances, is not strictly possible. In other instances, the terms "general," "generally," "approximately," and "substantially" are intended to represent the inherent degree of uncertainty that is often attributed to any quantitative comparison, value, and measurement calculation, or other representation, such that mathematical precision and exactitude is not implied and, in some instances, is not strictly possible.

It is to be understood that the foregoing description is of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," and "such as," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

Those of skill in the art will understand that modifications (additions and/or removals) of various components of the substances, formulations, apparatuses, methods, systems, and embodiments described herein may be made without departing from the full scope and spirit of the present disclosure, which encompass such modifications and any and all equivalents thereof.

The invention claimed is:

1. A vehicle track assembly, comprising:
   a spindle having a first set of splines, said spindle having a first clocking indicia;
   a first driver connected to said spindle and driven to rotate by said spindle;
   a drive sleeve having a second set of splines, said drive sleeve driven to rotate by said spindle via assembled engagement between said first set of splines and said second set of splines, said drive sleeve having a second clocking indicia;
   a second driver connected to said drive sleeve and driven to rotate by said drive sleeve; and
   a single track driven to move by said first driver and by said second driver via engagement therebetween;
   wherein said first clocking indicia and said second clocking indicia possess a rotationally-aligned arrangement with respect to each other, the rotationally-aligned arrangement between said first clocking indicia and said second clocking indicia providing concurrent and corresponding driving engagement between said first driver and said single track and said second driver and said single track with respect to each other;
   wherein said first driver has a third clocking indicia and said second driver has a fourth clocking indicia, wherein said first, second, third, and fourth clocking indicia possess a rotationally-aligned arrangement with respect to one another, the rotationally-aligned arrangement among said first, second, third, and fourth clocking indicia providing concurrent and corresponding driving engagement between said first driver and said single track and said second driver and said single track with respect to each other;
   and wherein said second driver comprises a second driver hub and a second driver trackring, said fourth clocking indicia located at said second driver hub or at said second driver trackring or at both said second driver hub and second driver trackring.

2. The vehicle track assembly as set forth in claim 1, wherein said first driver has a first set of teeth and said second driver has a second set of teeth, said single track has a first set of slots spanning therearound and a second set of slots spanning therearound, said first set of slots receiving recurring insertion of said first set of teeth of said first driver amid use of the vehicle track assembly, and said second set of slots receiving recurring insertion of said second set of teeth of said second driver amid use of the vehicle track assembly, and wherein the rotationally-aligned arrangement between said first clocking indicia and said second clocking indicia providing simultaneous and concurrent driving engagement among said first set of teeth and first set of slots and said second set of teeth and second set of slots for movement of said single track upon recurring insertion and reception thereamong during use of the vehicle track assembly.

3. The vehicle track assembly as set forth in claim 1, wherein said first driver comprises a first driver hub and a first driver trackring, said third clocking indicia located at said first driver hub or at said first driver trackring or at both said first driver hub and first driver trackring.

4. The vehicle track assembly as set forth in claim 1, wherein said first driver comprises a first driver hub and a first driver trackring, said third clocking indicia located at said first driver hub, said first driver trackring having a fifth clocking indicia, wherein said first clocking indicia, said second clocking indicia, said third clocking indicia, said fourth clocking indicia, and said fifth clocking indicia possess a rotationally-aligned arrangement with respect to one another, the rotationally-aligned arrangement among said first, second, third, fourth, and fifth clocking indicia providing concurrent and corresponding driving engagement between said first driver and said single track and said second driver and said single track with respect to each other.

5. The vehicle track assembly as set forth in claim 1, wherein said second driver comprises said second driver hub and said second driver trackring, said fourth clocking indicia located at said second driver hub, said second driver trackring having a fifth clocking indicia, wherein said first clocking indicia, said second clocking indicia, said third clocking indicia, said fourth clocking indicia, and said fifth clocking indicia possess a rotationally-aligned arrangement with respect to one another, the rotationally-aligned arrangement among said first, second, third, fourth, and fifth clocking indicia providing concurrent and corresponding driving engagement between said first driver and said single track and said second driver and said single track with respect to each other.

6. The vehicle track assembly as set forth in claim 1, wherein said first driver comprises a first driver hub and a first driver trackring, said third clocking indicia located at said first driver hub, said first driver trackring having a fifth clocking indicia, said second driver comprises said second driver hub and said second driver trackring, said fourth clocking indicia located at said second driver hub, said second driver trackring having a sixth clocking indicia.

7. The vehicle track assembly as set forth in claim 6, wherein said first clocking indicia, said second clocking indicia, said third clocking indicia, said fourth clocking indicia, said fifth clocking indicia, and said sixth clocking indicia possess a rotationally-aligned arrangement with respect to one another, the rotationally-aligned arrangement among said first, second, third, fourth, fifth, and sixth clocking indicia providing simultaneous and concurrent and corresponding driving engagement between said first driver and said single track and said second driver and said single track with respect to each other.

8. The vehicle track assembly as set forth in claim 1, further comprising a spacer connected to said first driver and having a connection with a vehicle component upon installation of the vehicle track assembly on a vehicle, said spacer having a fifth clocking indicia, wherein said first clocking indicia, said second clocking indicia, said third clocking indicia, said fourth clocking indicia, and said fifth clocking indicia possess a rotationally-aligned arrangement with respect to one another, the rotationally-aligned arrangement among said first, second, third, fourth, and fifth clocking indicia providing concurrent and corresponding driving engagement between said first driver and said single track and said second driver and said single track with respect to each other.

9. The vehicle track assembly as set forth in claim 1, further comprising a frame base hub that houses at least a section of said spindle and that houses at least one set of bearings, said frame base hub having a fifth clocking indicia, wherein said first clocking indicia, said second clocking indicia, said third clocking indicia, said fourth clocking indicia, and said fifth clocking indicia possess a rotationally-aligned arrangement with respect to one another, the rotationally-aligned arrangement among said first, second, third, fourth, and fifth clocking indicia providing simultaneous and concurrent driving engagement between said first driver and said single track and said second driver and said single track with respect to each other.

10. A vehicle track system comprising a plurality of the vehicle track assemblies as set forth in claim 1.

11. A method of providing concurrent and corresponding engagement among driver teeth of multiple drivers and sets of slots of a single track in a vehicle track assembly, the method comprising:
   providing a spindle having a first set of splines and having a first clocking indicia, providing a first driver having a first set of teeth and having a second clocking indicia, providing a drive sleeve having a second set of splines and having a third clocking indicia, providing a second driver having a second set of teeth and having a fourth clocking indicia, and providing said single track having a first set of slots and a second set of slots, wherein said second driver comprises a second driver hub and a second driver trackring, said fourth clocking indicia located at said second driver hub or at said second driver trackring or at both said second driver hub and second driver trackring;
   establishing rotational alignment of said first clocking indicia and said second clocking indicia with respect to each other upon connection between said spindle and said first driver;
   establishing rotational alignment of said first clocking indicia and said third clocking indicia with respect to each other upon engagement between said first set of splines and said second set of splines of said spindle and said drive sleeve; and
   establishing rotational alignment of said third clocking indicia and said fourth clocking indicia with respect to each other upon connection between said drive sleeve and said second driver, wherein said first, second, third, and fourth clocking indicia possess a rotationally-aligned arrangement with respect to one another, the rotationally-aligned arrangement among said first, second, third, and fourth clocking indicia providing concurrent and corresponding driving engagement between said first driver and said single track and said second driver and said single track with respect to each other, wherein said first driver comprises a first driver hub and a first driver trackring, said first set of teeth extending from said first driver trackring, said second clocking indicia located at said first driver hub or at said first driver trackring or at both said first driver hub and first driver trackring.

12. The method as set forth in claim 11, further comprising concurrently and correspondingly engaging said first set of teeth with said first set of slots and said second set of teeth with said second set of slots upon recurring insertion of said first set of teeth in said first set of slots during use of the vehicle track assembly and upon recurring insertion of said second set of teeth in said second set of slots during use of the vehicle track assembly.

13. The method as set forth in claim 11, wherein said second clocking indicia located at said first driver hub, said first driver trackring having a fifth clocking indicia, the method further comprising establishing rotational alignment of said fifth clocking indicia and said second clocking indicia with respect to each other upon connection between said first driver hub and said first driver trackring.

14. The method as set forth in claim 11, wherein said second driver comprises said second driver hub and said second driver trackring, said second set of teeth extending from said second driver trackring, said fourth clocking indicia located at said second driver hub, said second driver trackring having a fifth clocking indicia, the method further comprising establishing rotational alignment of said fifth clocking indicia and said fourth clocking indicia with respect to each other upon connection between said second driver hub and said second driver trackring.

15. The method as set forth in claim 11, further comprising providing a spacer having a fifth clocking indicia and establishing rotational alignment of said second clocking indicia and said fifth clocking indicia with respect to each other upon connection between said first driver and said spacer.

16. A method of providing concurrent and corresponding engagement among driver teeth of multiple drivers and sets of slots of a single track in a vehicle track assembly, the method comprising:
  providing a spindle having a first set of splines and having a first clocking indicia, providing a first driver having a first set of teeth and having a second clocking indicia, providing a drive sleeve having a second set of splines and having a third clocking indicia, providing a second driver having a second set of teeth and having a fourth clocking indicia, and providing said single track having a first set of slots and a second set of slots;
  establishing rotational alignment of said first clocking indicia and said second clocking indicia with respect to each other upon connection between said spindle and said first driver;
  establishing rotational alignment of said first clocking indicia and said third clocking indicia with respect to each other upon engagement between said first set of splines and said second set of splines of said spindle and said drive sleeve; and
  establishing rotational alignment of said third clocking indicia and said fourth clocking indicia with respect to each other upon connection between said drive sleeve and said second driver;
  wherein said first driver comprises a first driver hub and a first driver trackring, said first set of teeth extending from said first driver trackring, said second clocking indicia located at said first driver hub, said first driver trackring having a fifth clocking indicia, said second driver comprises a second driver hub and a second driver trackring, said second set of teeth extending from said second driver trackring, said fourth clocking indicia located at said second driver hub, said second driver trackring having a sixth clocking indicia, the method further comprising establishing rotational alignment of said fifth clocking indicia and said second clocking indicia with respect to each other upon connection between said first driver hub and said first driver trackring, and establishing rotational alignment of said sixth clocking indicia and said fourth clocking indicia with respect to each other upon connection between said second driver hub and said second driver trackring.

17. A vehicle track assembly, comprising:
  a spindle having a first set of splines, said spindle having a first clocking indicia;
  a first driver driven to rotate by said spindle, said first driver including a first driver hub and a first driver trackring, said first driver hub connected to said spindle and having a second clocking indicia, said first driver trackring having a first set of teeth and having a third clocking indicia;
  a drive sleeve having a second set of splines, said drive sleeve driven to rotate by said spindle via assembly between said first set of splines and said second set of splines, said drive sleeve having a fourth clocking indicia;
  a second driver driven to rotate by said drive sleeve, said second driver including a second driver hub and a second driver trackring, said second driver hub connected to said drive sleeve and having a fifth clocking indicia, said second driver trackring having a second set of teeth and having a sixth clocking indicia;
  a spacer connected to said first driver and having a connection with a vehicle component upon installation of the vehicle track assembly on a vehicle, said spacer having a seventh clocking indicia; and
  a single track driven to move by said first driver and by said second driver, said single track having a first set of slots spanning therearound and a second set of slots spanning therearound, said first set of slots receiving recurring insertion of said first set of teeth of said first driver trackring amid use of the vehicle track assembly, and said second set of slots receiving recurring insertion of said second set of teeth of said second driver trackring amid use of the vehicle track assembly;
  wherein said first clocking indicia, said second clocking indicia, said third clocking indicia, said fourth clocking indicia, said fifth clocking indicia, said sixth clocking indicia, and said seventh clocking indicia possess a rotationally-aligned arrangement with respect to one another, the rotationally-aligned arrangement among said first, second, third, fourth, fifth, sixth, and seventh clocking indicia providing concurrent and corresponding engagement among said first set of teeth and first set of slots and said second set of teeth and second set of slots for movement of said single track upon recurring insertion and reception thereamong during use of the vehicle track assembly.

* * * * *